March 30, 1965 G. A. GIBSON 3,175,821

PLURAL STAGE CALIPER CONTROLLED COLLATOR

Filed Oct. 14, 1960 13 Sheets-Sheet 1

INVENTOR.

GEORGE A. GIBSON

BY

Morgan, Finnegan, Durham & Pine

ATTORNEYS.

March 30, 1965 G. A. GIBSON 3,175,821

PLURAL STAGE CALIPER CONTROLLED COLLATOR

Filed Oct. 14, 1960 13 Sheets-Sheet 2

INVENTOR.
GEORGE A. GIBSON
BY
Morgan, Finnegan, Durham & Pine
ATTORNEYS.

March 30, 1965 G. A. GIBSON 3,175,821

PLURAL STAGE CALIPER CONTROLLED COLLATOR

Filed Oct. 14, 1960 13 Sheets-Sheet 3

INVENTOR.
GEORGE A. GIBSON
BY
Morgan, Finnegan, Durham & Pine
ATTORNEYS.

PLURAL STAGE CALIPER CONTROLLED COLLATOR

Filed Oct. 14, 1960 13 Sheets-Sheet 4

INVENTOR.
GEORGE A. GIBSON
BY
Morgan, Finnegan, Durham & Pine
ATTORNEYS.

March 30, 1965 G. A. GIBSON 3,175,821

PLURAL STAGE CALIPER CONTROLLED COLLATOR

Filed Oct. 14, 1960 13 Sheets-Sheet 5

INVENTOR.
GEORGE A. GIBSON
BY
Morgan, Finnegan, Durham & Pine
ATTORNEYS.

PLURAL STAGE CALIPER CONTROLLED COLLATOR

INVENTOR.
GEORGE A. GIBSON
BY
Morgan, Finnegan, Durham & Pine
ATTORNEYS.

PLURAL STAGE CALIPER CONTROLLED COLLATOR

INVENTOR.
GEORGE A. GIBSON
BY
Morgan, Finnegan, Durham & Pine
ATTORNEYS.

March 30, 1965 G. A. GIBSON 3,175,821

PLURAL STAGE CALIPER CONTROLLED COLLATOR

Filed Oct. 14, 1960 13 Sheets-Sheet 8

INVENTOR.
GEORGE A. GIBSON
BY
Morgan, Finnegan, Durham & Pine
ATTORNEYS.

PLURAL STAGE CALIPER CONTROLLED COLLATOR

INVENTOR.
GEORGE A. GIBSON
BY
Morgan, Finnegan, Durham & Pine
ATTORNEYS.

March 30, 1965 G. A. GIBSON 3,175,821

PLURAL STAGE CALIPER CONTROLLED COLLATOR

Filed Oct. 14, 1960 13 Sheets-Sheet 10

INVENTOR.
GEORGE A. GIBSON
BY
Morgan, Finnegan, Durham & Pine
ATTORNEYS.

PLURAL STAGE CALIPER CONTROLLED COLLATOR

Filed Oct. 14, 1960 13 Sheets-Sheet 11

INVENTOR.
GEORGE A. GIBSON
BY
Morgan, Finnegan, Durham & Pine
ATTORNEYS.

March 30, 1965 G. A. GIBSON 3,175,821

PLURAL STAGE CALIPER CONTROLLED COLLATOR

Filed Oct. 14, 1960 13 Sheets-Sheet 12

INVENTOR.
GEORGE A. GIBSON
BY
Morgan, Finnegan, Durham & Pine
ATTORNEYS.

INVENTOR.
GEORGE A. GIBSON
BY
Morgan, Finnegan, Durham & Pine
ATTORNEYS.

United States Patent Office 3,175,821

Patented Mar. 30, 1965

3,175,821
PLURAL STAGE CALIPER CONTROLLED COLLATOR

George A. Gibson, New York, N.Y.
(165 Clymer St., Brooklyn 11, N.Y.)

Filed Oct. 14, 1960, Ser. No. 62,603
48 Claims. (Cl. 270—58)

This invention relates to machines for assembling sheet articles in predetermined relationship and more particularly to means for automatically collating stock such as sheets of paper.

Presently known collating machines provide some semblance of automaticity in their operation wherein there is an automatic assembly of sheets into collated stacks with the stacks being progressively and continuously collated during the operation of the machine. These known machines, while effecting economies in labor and time, nevertheless require substantial supplementary manual operations particularly in the early and terminal parts of the operation when the first and last groups of collated stacks are being formed. In addition, these machines inevitably take up a considerable amount of space and since they are frequently employed in business and commercial areas where space is at a premium, their bulky character represents in many cases a substantial overhead expense. Many of the machines used heretofore are also notoriously unreliable, breaking down at frequent intervals and requiring constant maintenance. Moreover, those areas which require manual intervention are generally inaccessible and present difficulties and hazards to the operator. An additional defect resides in the fact that there is frequently uncertainty in the operation of the machine to the extent that the collated stacks may contain an excess or deficiency of component sheets.

It is accordingly an object of the invention to provide collating apparatus which through a novel relationship among the mechanisms provides large capacity operation in a minimum of space.

A still further object of the invention is to provide collating apparatus so instrumented as to be substantially automatic in all phases of its operation.

An additional object of the invention is to provide collating apparatus with means for insuring with virtual certainty that the correct number of sheets have been assembled.

A still further object of the invention is to provide collating means having a plurality of collating stages so interrelated in time as to produce reliable high-speed operation.

Other objects include the provision of a collator which is readily controlled by the operator, which, while rapid and certain in operation, handles the sheet material in a delicate manner so as not to mar or deform the same and which is adaptable to handle a variety of collating tasks involving different sizes and numbers of sheets.

These and other objects and advantages of the invention will be set forth in part hereinafter and in part will be obvious herefrom, or may be learned by practice with the invention, the same being realized and attained by means of the instrumentalities and combinations pointed out in the appended claims.

Briefly and generally the invention consists of collating means comprising a plurality of sheet-issuing stages spatially and synchronously interrelated such that the stages issue sheets to a receiving means synchronized therewith to form collated stacks. The invention also includes novel caliper means for checking the operation of a sheet-issuing stage or stages, novel triggering and control means for rendering a plurality of stages and certain modes of operation thereof interdependent, and a novel arrangement between impelling means associated with the receiving means and the spatial orientation of the sheet-issuing stages.

The invention consists in the novel parts, constructions, arrangements, combinations and improvements herein shown and described.

Illustrating an exemplary embodiment of the invention are the drawings. These drawings are to some extent fragmentary and to some extent schematic so that the principles of operation and significant details of construction may be clearly perceived. In addition, except for FIGURES 2, 11, 18, 19, 26 and 27, all of the drawings represent views which are orthogonal to or parallel to the plane identified as 72 in FIGURE 2.

Of the drawings:

FIGURE 1 is an elevation view partly in cross-section illustrating the collator according to the invention as seen from the front thereof with four stages illustrated;

FIGURE 1*a* is a continuation of the subject matter of FIGURE 1, also partly in cross-section, illustrating the output end of the collator;

Figure 3:
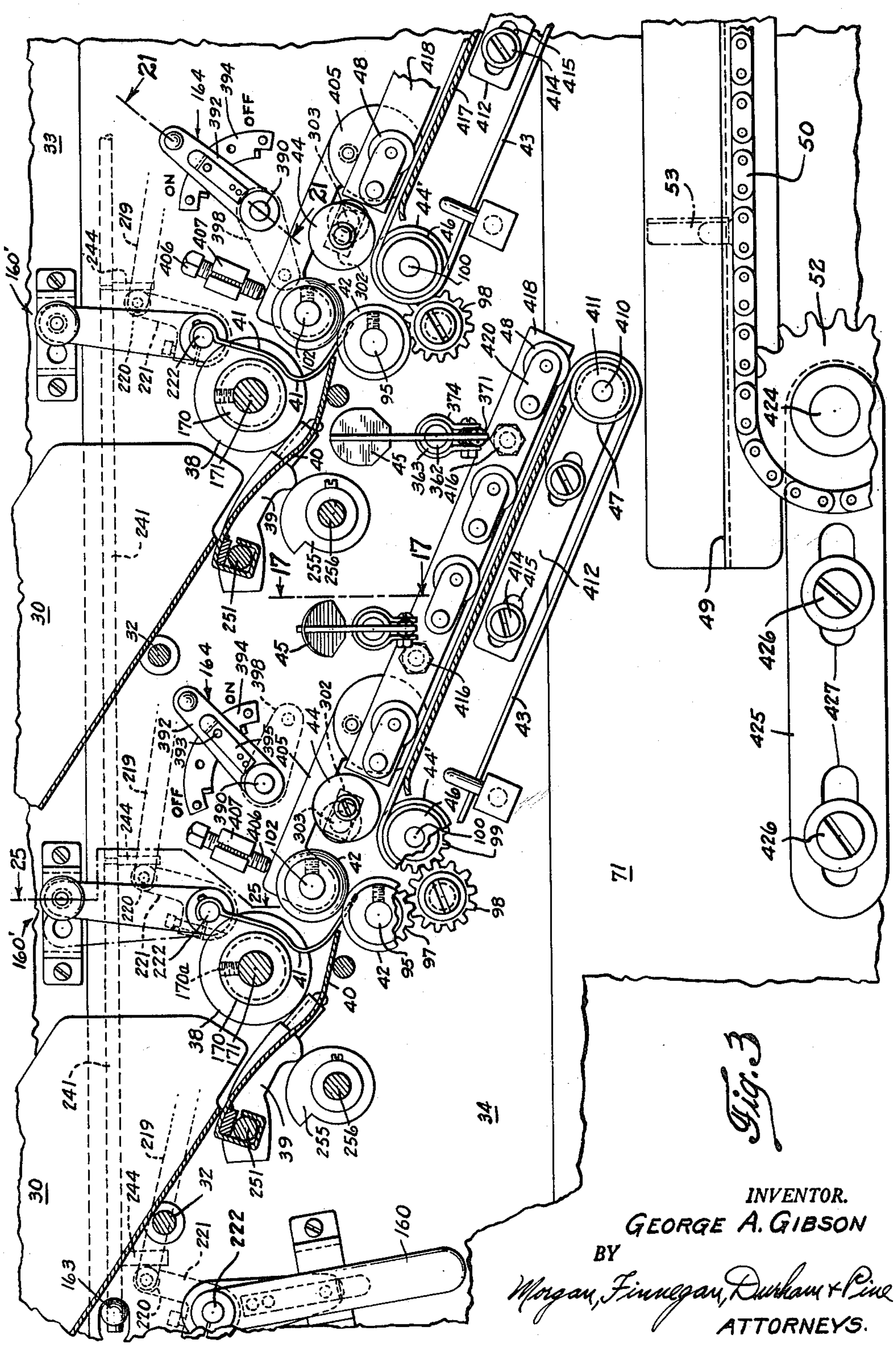
FIGURE 3 is an enlarged elevation view of a section of FIGURE 1 illustrating the various means associated with each stage for causing the controlled and monitored issuance of the sheet therefrom.
Figures 12, 12A, 12B:
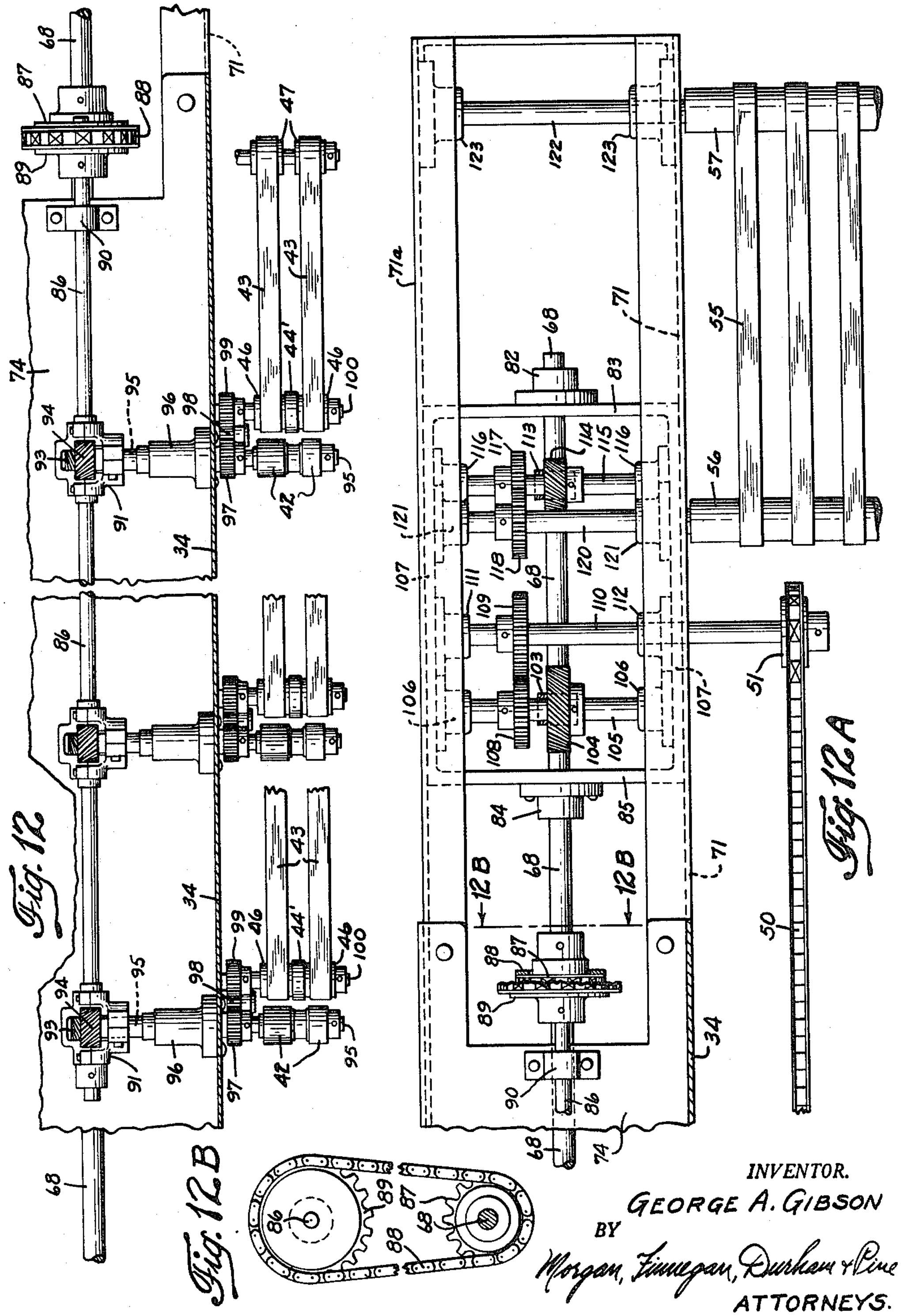
FIGURE 12 is a plan view partly in section illustrating certain power transmission mechanisms and conveyors of the collator according to the invention.
Figure 13:
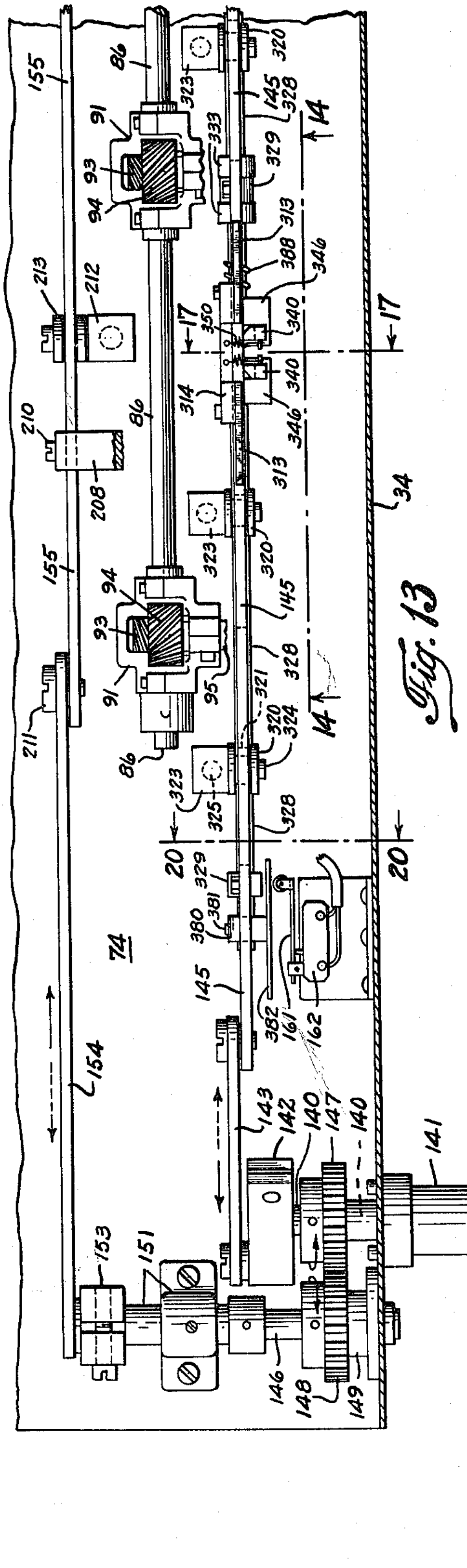
Figure 14:
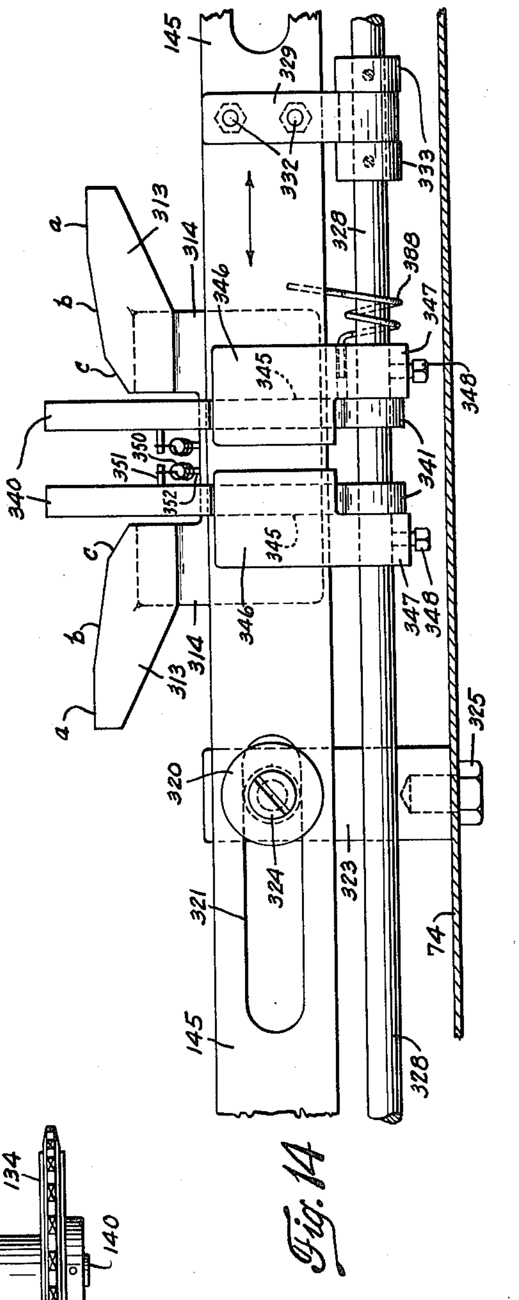
Figures 15, 16:
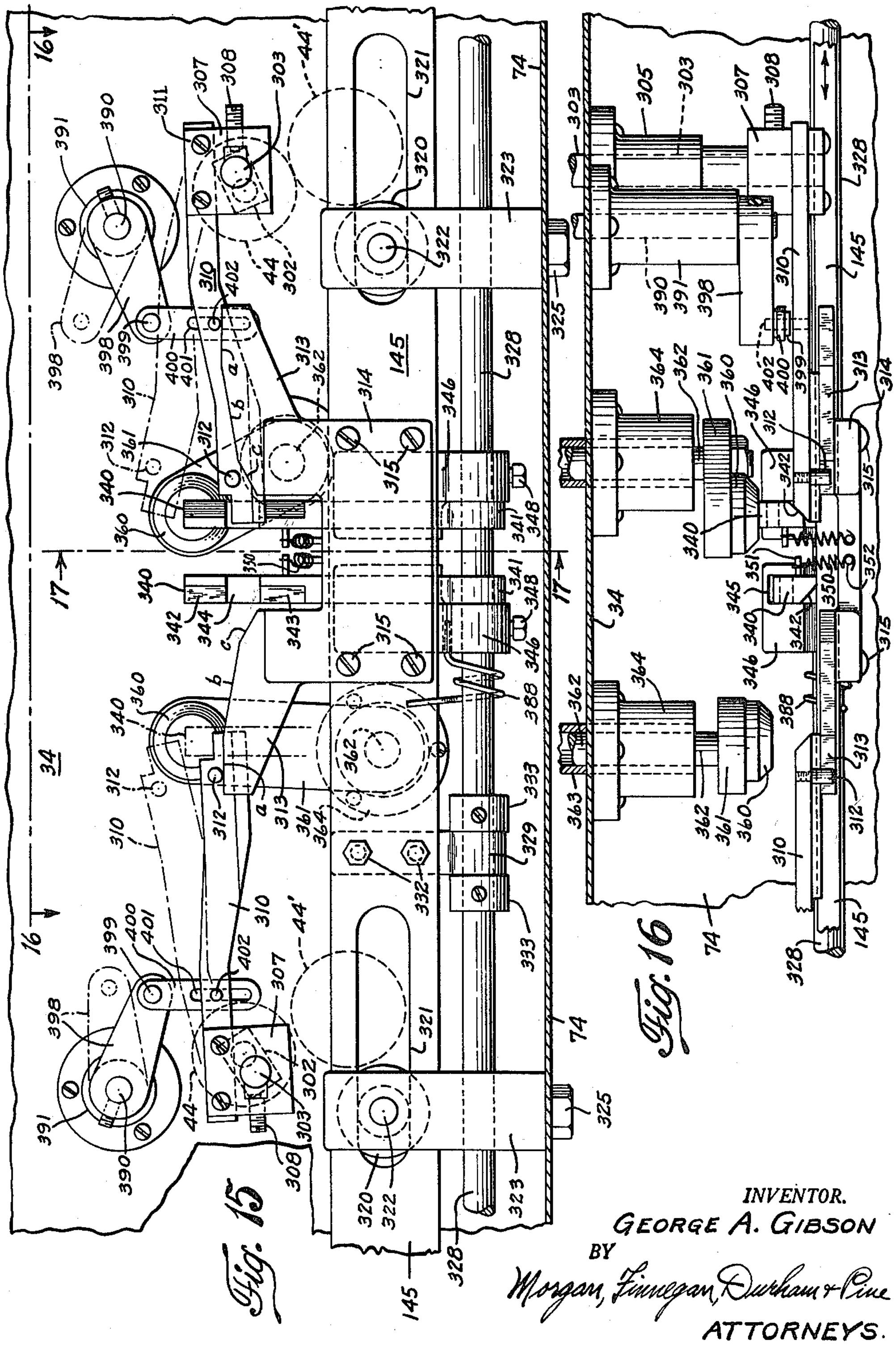
Figures 17, 18, 19, 20, 21:
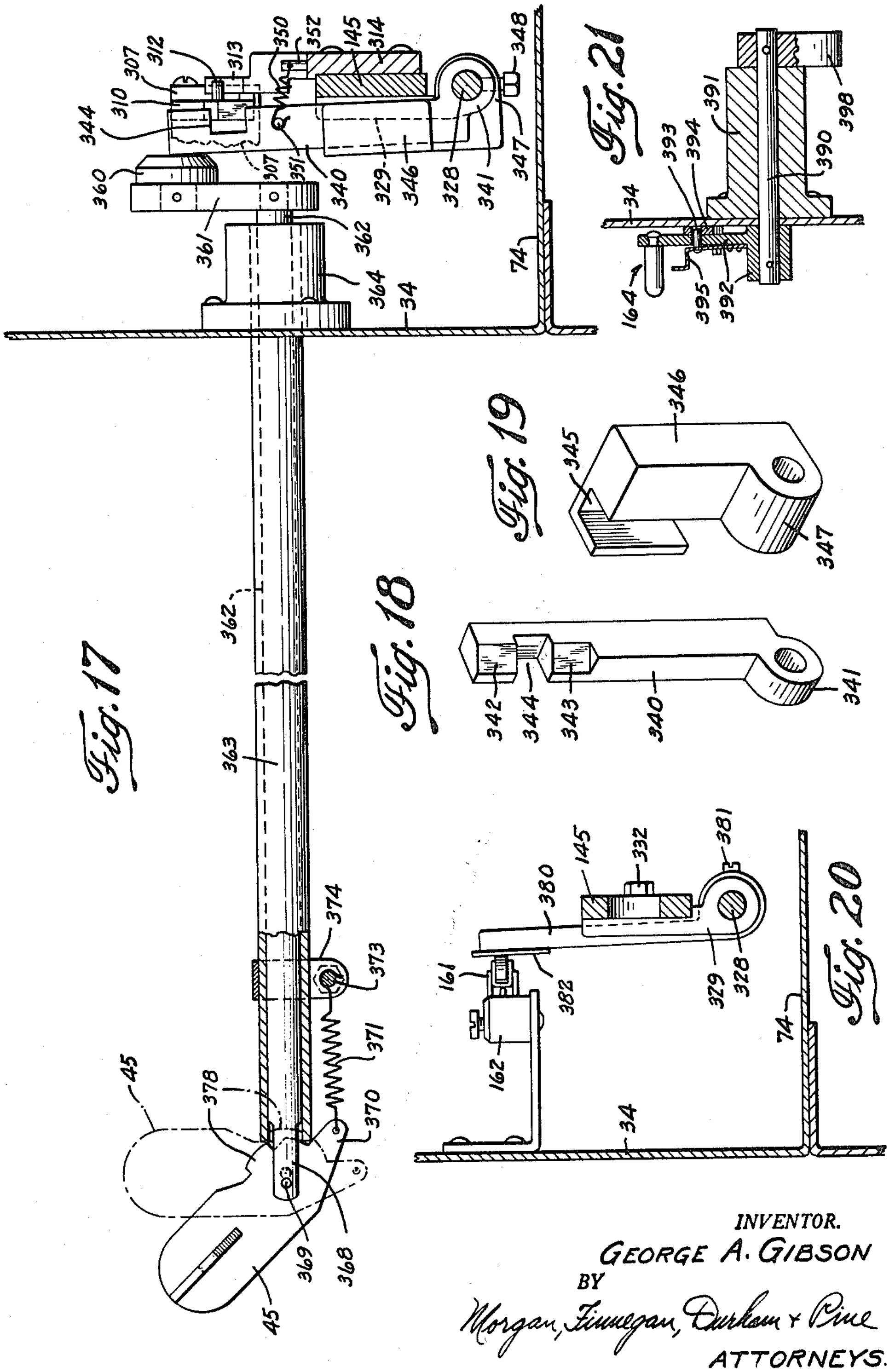
Figure 22:
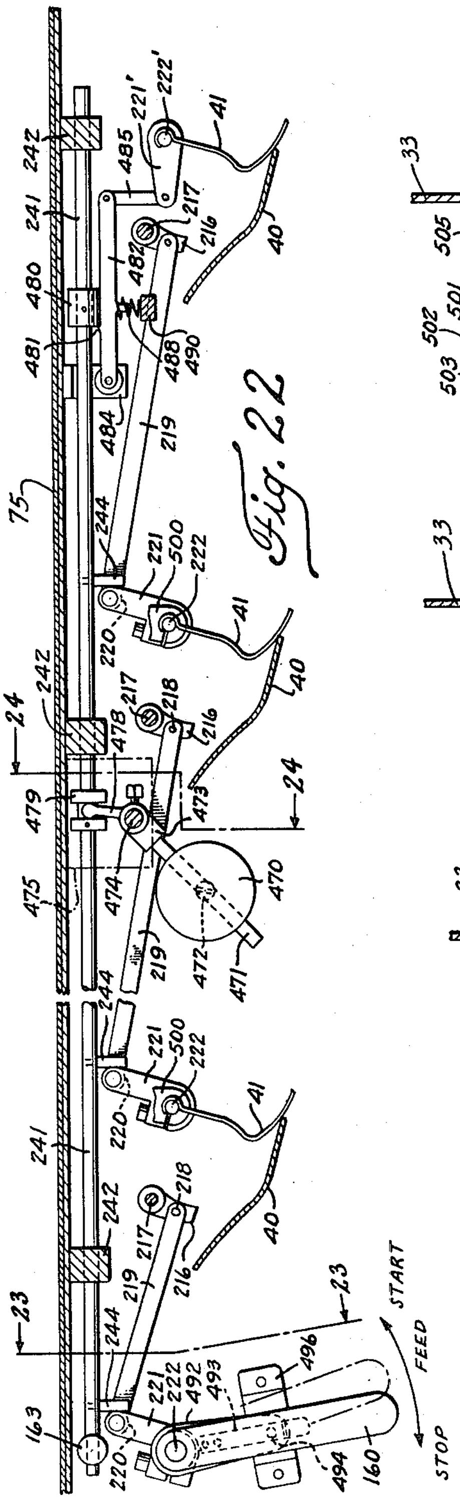
Figure 25:
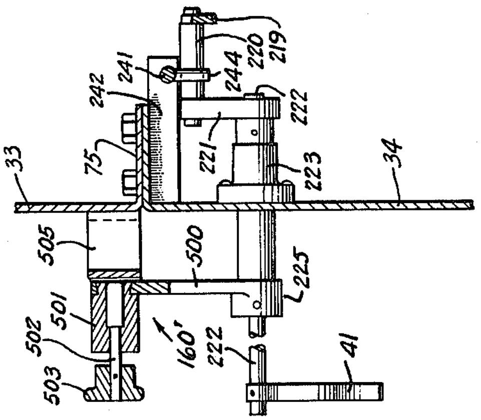
Figure 24:
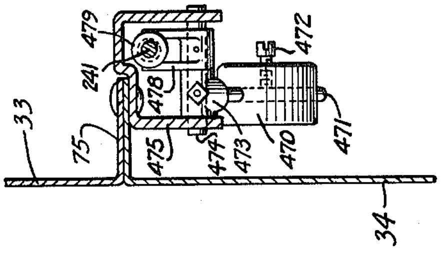
Figure 23:
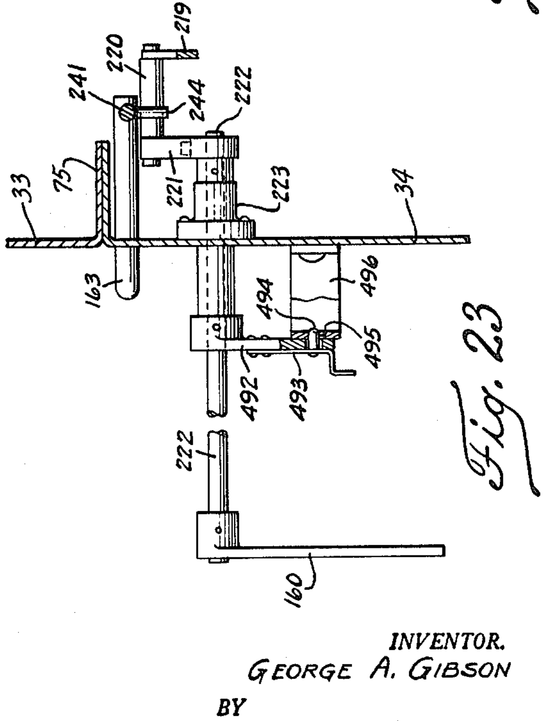
Figures 26, 27:
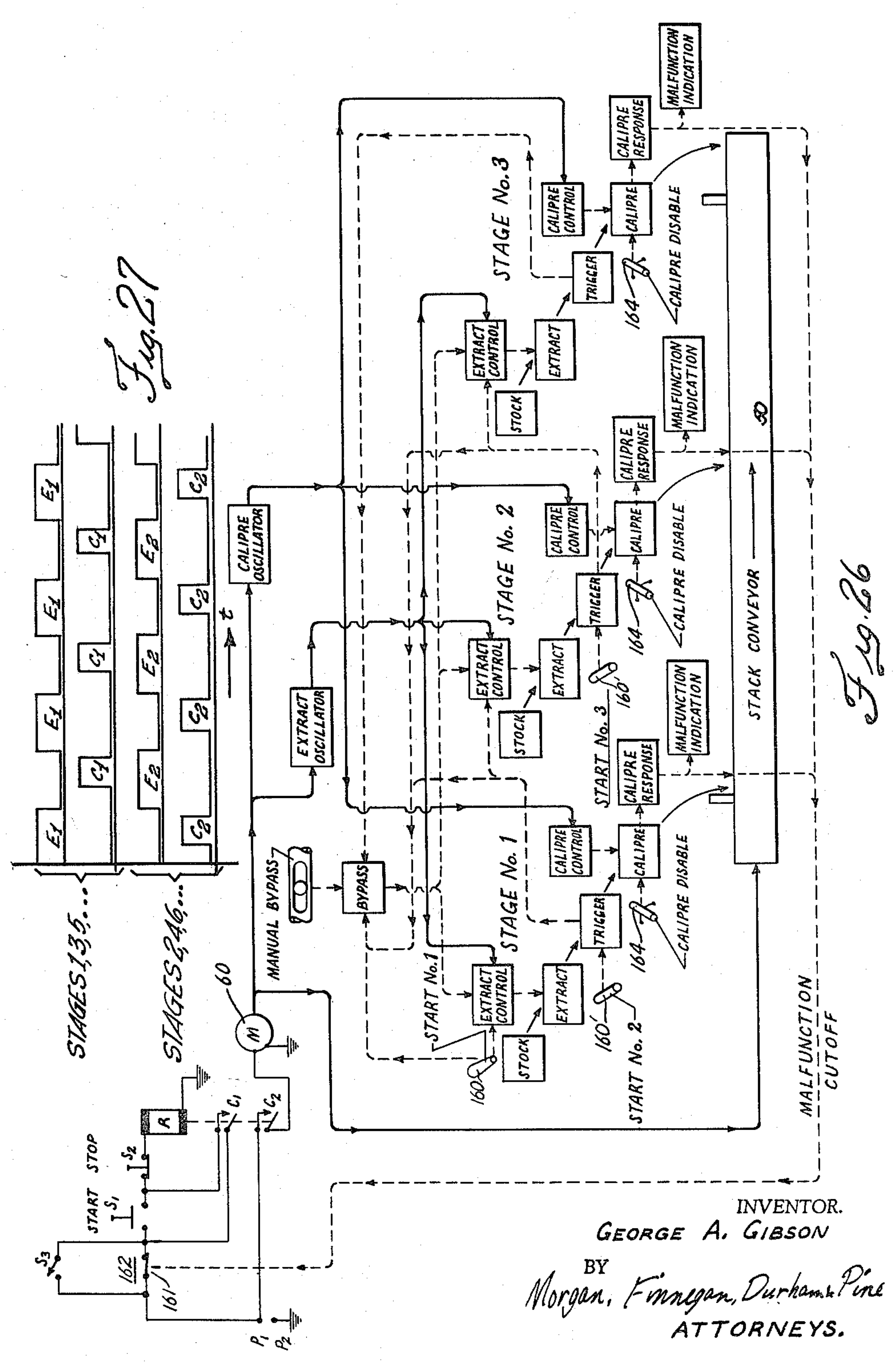

FIGURE 12*a* is a plan view partly in section illustrating a continuation of the subject matter shown in part in FIGURE 12;

FIGURE 12*b* is an end elevation view partly in section taken along the lines **12*b*—12*b*** of FIGURE 12*a*;

FIGURE 13 is a plan view partly in section illustrating certain driven and oscillator mechanisms for providing extraction and caliper functions and mechanism for providing controlled caliper operation;

FIGURE 14 is an enlarged view taken along the lines 14—14 of FIGURE 13 and illustrating means for controlling the caliper function;

FIGURE 15 is an opposing elevation view of the subject matter of FIGURE 14 and also illustrating additional mechanisms associated with the caliper function;

FIGURE 16 is a view taken along the lines 16—16 of FIGURE 15;

FIGURE 17 is a view partly in section taken along the lines 17—17 of FIGURE 15 and illustrating additional mechanisms associated with the caliper function;

FIGURES 18 and 19 are perspective views illustrating elements operable in the caliper function as illustrated in FIGURES 13 to 17;

FIGURE 20 is an end elevation view partly in section taken along the lines 20—20 of FIGURE 13;

FIGURE 21 is an end elevation view partly in section taken along the lines 21—21 of FIGURE 3 and illustrating caliper disable means;

FIGURE 22 is a front elevation view partly in section of trigger function control mechanisms as seen when looking towards the rear of the machine with front panel sections 33 and 34 removed;

FIGURE 23 is an end elevation view partly in section taken along the lines 23—23 of FIGURE 22;

FIGURE 24 is an end elevation view partly in section taken along the lines 24—24 of FIGURE 22;

FIGURE 25 is an end elevation view partly in section taken along the lines 25—25 of FIGURE 3;

FIGURE 26 is a functional data flow diagram illustrating certain elements of each stage of the machine together with motor control circuit means and schematic representations of certain intra-stage and interstage interrelationships in the collator according to the invention; and FIGURE 27 is a schematic illustration of exemplary intrastage and inter-stage timing relationships.

*General characteristics*

Figure 1A:
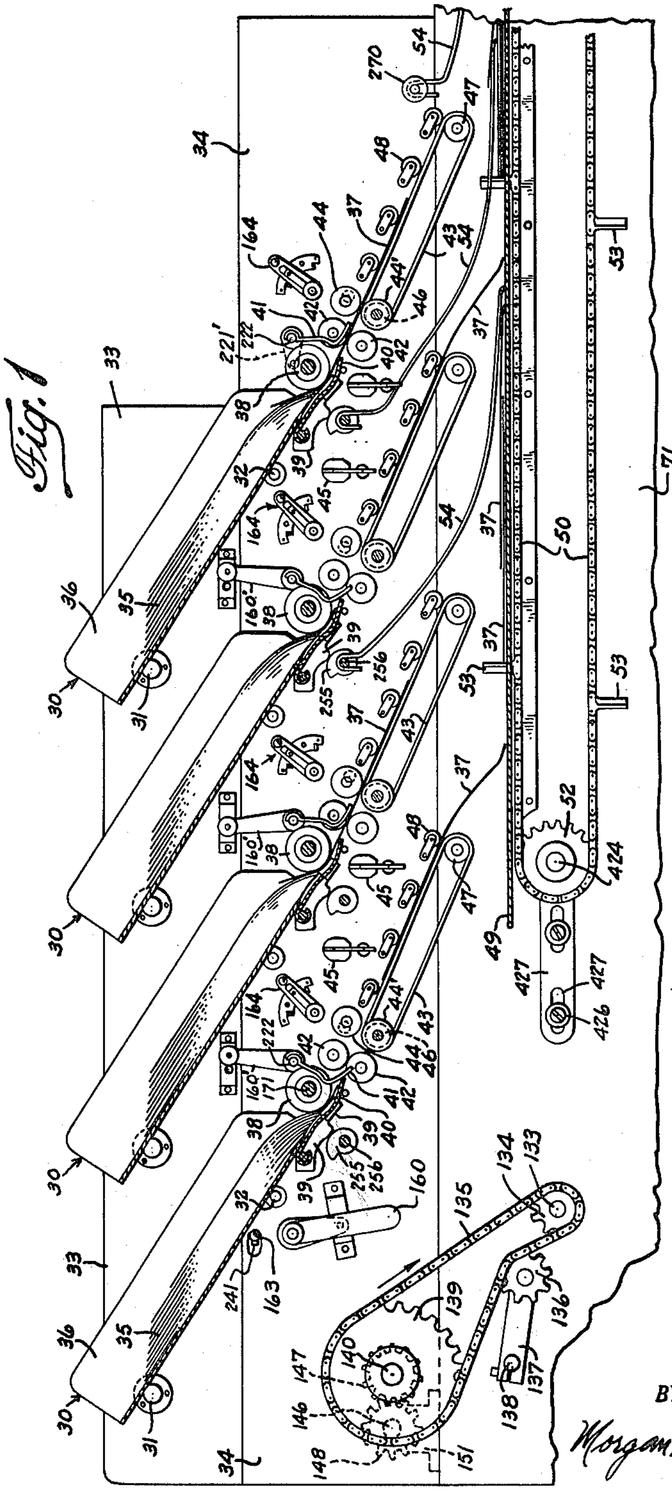
Figure 1A:
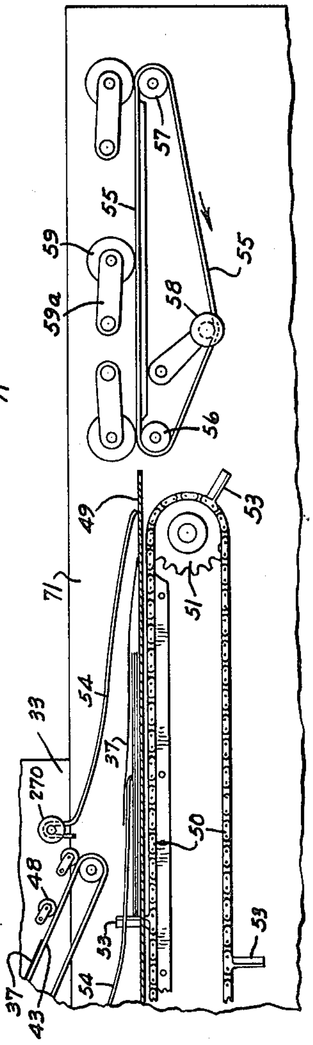
Figure 2:
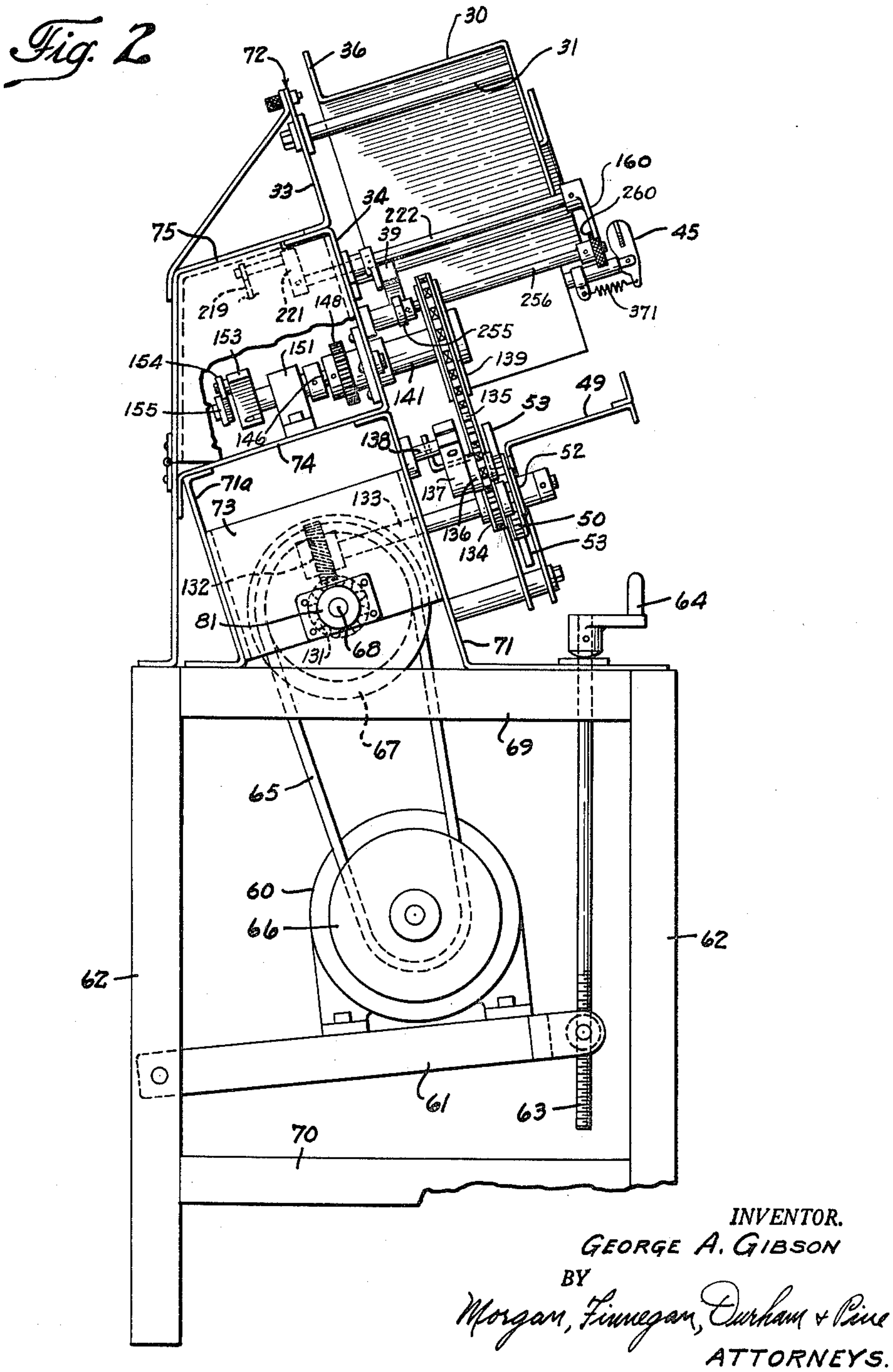
FIGURE 2 is an end elevation of the collator illustrating the framework, panelling, certain of the drive mechanisms and the general structural layout.

As sene in FIGURES 1, 1*a*, and 2, the collator according to the invention comprises a tandem array of stages each including an inclined hopper 30 at the front (right side of FIGURE 2) of the collator. Each hopper is connected to and carried on a strut 31 which is secured to and extends orthogonally outward from chassis panel 33. The lower region of each hopper also rests on a guide plate 40 coupled to a panel 34. Since the panels 33, 34 are inclined towards the rear of the machine (left side of FIGURE 2), the hoppers, besides being inclined longitudinally towards the output end of the collator, are also inclined towards the rear thereof as seen in FIGURE 2, and the piles of stock 35 carried thereon are accordingly urged both downward and against back walls 36 of the respective hoppers.

Extraction of sheets 37 from the stock 35 of each hopper 30 is facilitated by the operation of an extractor control roll 38 and cooperating control finger 39 both disposed at the bottom, feed end, of each hopper, so as to engage the stock 35 and in particular, the top sheet thereof. This action is facilitated by fanning the stock to form a canted pile as shown in FIGURE 1. Each extractor control roll, preferably of soft rubber, is intermittently operated in one direction (ccw. as seen in FIGURE 1) as described more fully hereinafter, and in combination with the respective control finger 39 which bears lightly against the periphery of the roll 38, acts to extract sheets 37 from the respective stock pile 35. A system of this general arrangement is disclosed in applicant's Patent No. 2,155,895.

As each sheet at each stage issues from between roll 38 and finger 39, the leading edge, impelled by roll 38 and directed by the extractor guide plate 40 contacts the underside and angularly displaces a trigger finger 41 which as more fully described hereinafter, signals the passage of sheet 37 through the particular stage and initiates an extraction cycle at the next stage. As it engages trigger finger 41, the lead edge of sheet 37 is gripped between a pair of transfer rolls 42. The lower roll 42 is preferably of rubber and is driven to rotate continuously clockwise (as seen in FIGURE 1). The rolls 42 act to impel sheet 37 between an intermittently operated caliper roll 44 and a continuously driven anvil roll 44′. The caliper 44 is synchronously moved into contact with and senses the thickness of the material passing between it and the anvil roll 44; if more or less than one or some predetermined number of sheets 37 is present, caliper roll 44 is displaced to thereby initiate signalling actions including the generation of cut-off signals which terminate certain operations and also including the energization of signal means such as signal flag 45 at the particular malfunctioning station. These operations will be more fully described hereinafter.

After being calipered, and assuming the correct caliper response, sheet 37 is transported on a pair of coplanar sheet conveyor belts 43 each of which is driven by a pulley 46 in cooperation with a respective idler pulley 47. For urging sheet 37 against belts 43, a plurality of guide rolls 48 disposed along each belt 43 are provided, these being freely rotatable and gravity urged against the sheets 37 as they pass along the conveyor belts 43.

After leaving belts 43, the sheets 37 pass to receiving means including a platform 49. Disposed below the platform is a stack conveyor comprising endless chain 50 driven by sprocket 51 (FIGURE 1*a*) in combination with idler 52 and having a series of impeller fingers 53 which are carried on chain 50 and extend through a longitudinal slot in platform 49. After a sheet 37 is received by platform 49 it is engaged by an impeller 53 and impelled along the platform, passing under the succeeding stations. As it reaches the region of the next succeeding station a sheet issues therefrom, the latter having been extracted from its respective hopper in response to either the actuation of the trigger finger 41 of the prior station as described above or by means described hereinafter. (The second and succeeding stages are instrumented similarly to the first described stage except as otherwise noted.)

To bring the stack of two sheets into registration—the later issued one having landed by virtue of machine timing in overlapping but not necessarily aligned relationship with respect to the first issued sheet (see FIGURE 1) —there is provided a register finger 54, the proximal end of which is pivotally hung from the panel 34 at the third (and succeeding) stages adjacent the sheet conveyor means of the second station. The distal end of each register finger 54 lies on platform 49 and upon being contacted by the later-delivered sheet, temporarily restrains the same in a fixed position on the platform 49 until the trailing edge of this sheet is contacted by the stack impeller 53. At this time the sheets are in register. Register finger 54 is then displaced away from the leading edge of the now-registered stack due to the thrust of the impeller 53, thereby permitting the stack of sheets to be impelled to the next station.

The above-described actions are repeated as desired until the desired quantity of sheets 37 are collated. As may be seen clearly in FIGURE 1*a*, the sheet issuing from the final stage is brought into register with the collated sheets 37 and the completed stack is impelled to a receiver conveyor comprising a plurality of coplanar endless receiver belts 55 driven by a pulley system including drive pulley 56, idler pulley 57 and tension pulley 58. For urging the stack against receiver belts 55, there is provided for each a plurality of freely rotatable receiver guide rolls 59 rotatably mounted on the ends of respective levers **59*a*** the other ends of which are pivoted to the frame. From the receiver conveyor, which travels at a higher linear speed than the stack conveyor, the collated stack may be delivered to suitable known mechanisms for stapling, stitching or the like.

Power distribution for effecting operation of the various mechanisms will be described more fully hereinafter, it being noted here that the main motive means comprise a motor 60, FIGURE 2, mounted on an adjustable platform 61, the rear end of which is pivoted on a rear frame strut 62 and the forward end of which is effectively threaded on a vertical worm shaft 63 having a handle 64 secured thereto. The handle when rotated, adjusts the angular position of platform 61 and accordingly adjusts the position of motor 60 to cause the tension in main power belt 65 to determine the effective diameter of pulley 66 on motor 60 thus permitting adjustment of the speed at which idler pulley 67, fast on main shaft 68, is driven. As described more fully hereinafter, several transmission means supply motive power from main shaft 68 to the various dynamic members such as the extractor, caliper, sheet conveyor, stack conveyor and receiver conveyor means.

The above-described mechanisms of the collator according to the invention, are mounted on a chassis comprising a generally rectangular base table formed of vertical struts 62, FIGURE 2, forming legs thereof, braces 69 defining the top surface thereof, these being interconnected with struts 62, and cross braces 70, also interconnecting struts 62. Mounted on and secured to the top braces 69 is a chassis structure comprising the front panel section 71, FIGURE 2, and successively above section 71, the aforementioned panel sections 34 and 33. The sections 33, 34 and 71 are coplanar and connected along contiguous longitudinal edges to form a complete front panel 72 secured to the base and running the length of the machine. Various of the operating mechanisms are secured to sections 33, 34 and 71 while others are secured to the base or to lateral flanges 73, 74 and 75, the last two being respectively orthogonal to and integral with panel sections 33 and 34. Those mechanisms which are operative in actually measuring and manipulating the stock, as well as the various controls, are oriented in front of panel 72 while the actuating means for these mechanisms are to the rear of the panel. This arrangement, in conjunction with the rearward tilt of panel 72 and the termination of various shafts and the like in journals mounted on the panel provides important accessibility. The operator may readily reach the hoppers 30, the stack conveyor 51, the various feed mechanisms, operator controls and indicators 45, without interference from shaft supports, drive mechanisms and actuating means.

*Operating characteristics*

It will be assumed that motor 60 is energized and running. Accordingly, the transfer rolls, 42, at each stage, FIGURE 1, the sheet conveyor 43 at each stage, the common stack conveyor 50 and the receiver conveyor 55 are all placed in continuous rotary operation. The caliper rolls 44 are intermittently positioned in their sensing modes of operation. However, as explained more fully hereinafter, the extractor control roll 38 at each stage, FIGURE 1, is not operated and sheets accordingly do not issue therefrom.

With motor 60 running, an extractor start lever 160, FIGURES 1–3, 22, 23, 26 is placed in the Start position (FIG. 22), and by means more fully described hereinafter, actuation of this lever triggers the extractor control means of Stage No. 1, as illustrated schematically in FIGURE 26. The extractor control roll 38 of that stage accordingly commences rotation which results in the extraction of a predetermined number of sheets, e.g., one, from the associated hopper 30. This is symbolized at Stage No. 1 of FIG. 26 by the solid arrow. The sheet thus extracted, as noted hereinbefore, actuates the trigger 41 of Stage No. 1, thereafter passing through the caliper means, etc., to the stack conveyor 50. The actuation of trigger 41 causes, in turn, actuation of control mechanism for the transmission of a control signal to the extractor control means of Stage No. 2. See FIGURE 26. The extractor roll 38 at this stage is accordingly actuated in similar manner to the corresponding control roll of Stage No. 1, whereby a sheet is extracted from the hopper 30 of Stage No. 2 and, after transition through the associated trigger 41, the transfer rolls 42, caliper 44, etc., is stacked on the prior issued sheet of Stage No. 1. The relative timing of the extraction functions of each stage is controlled, as later described, such that the sheet of Stage No. 2 is not extracted until a predetermined interval after the extraction of the associated sheet of Stage No. 1, whereby, with a coordinated timing of the stack conveyor, the sheet of Stage No. 2 is delivered in overlapping relationship to the complementary Stage No. 1 sheet.

The extraction of a sheet from Stage No. 2 causes a triggering of Stage No. 3 in the manner above described, whereby a third sheet from the latter stage is added to the stack being formed on the stack conveyor. This action continues in progressive fashion until sheets have been delivered to the stack from all stages to complete the same. While this is occurring, new stacks are being concurrently formed, since Stage No. 1, being continuously triggered by lever 160, continues repetitively to issue sheets, thus triggering sheets from the subsequent stages; all this occurs while the first stack is receiving sheets from the later stages.

By providing the triggering function described above, the stages issue sheets continuously and progressively so that the formation of incomplete stacks at the beginning and end of the collating operation is avoided. This may be contrasted with prior arrangements in which all of the stages issue sheets simultaneously and the operator is required to discard or manually complete the first and last group of stacks.

The triggering function may be disadvantageous at times other than the beginning and end of the collating operation and means described below are accordingly provided for by-passing the triggering function. It may also be noted that the triggering feature to some extent has a caliper function in that it acts to prevent the issuance of a sheet from a succeeding stage when a sheet fails to be extracted from the preceding stage. However, this function is also provided by the operations of other means described below and hence the triggering function may be properly by-passed during certain periods of the collating process as will become clearer from the description below.

In the sourse of issuing from each stage, the extracted sheets, as noted hereinbefore, are subjected to caliper means to determine whether the proper number of sheets has been extracted. This action is schematically indicated in FIG. 26. Thus, after a sheet passes trigger 41 and between transfer rolls 42, the caliper roll 44 is moved by caliper control means, described hereinafter, into a sensing position wherein the number of extracted sheets is sensed or detected. If the number is correct, there is no change in the collating operation. If the number is incorrect, then means responsive to the caliper means 44 are activated resulting in two signalling actions: first, an indication at the malfunctioning stage is provided (FIG. 26) conveniently in the form of the signal flag 45 which is forwardly displaced to thereby identify the malfunctioning stage. At substantially the same time, the armature 161 of a normally closed microswitch 162, FIGURES 13, 20, 26, is actuated to open the circuit to motor 60 and stop the same. The collating operation is accordingly terminated.

For the sake of illustration it will be assumed that the above-described malfunction occurred at Stage No. 2 in the middle of the collating operation and took form in the failure to provide extraction of a sheet. This failure would terminate the triggering action at Stage No. 3. Moreover, the caliper means at Stage No. 2, detecting no sheet, would cause the collator to stop. Assuming further that the operator manually replaced the missing sheet, the collating operation could then be restarted. However, in view of the triggering function described above, Stage No. 3 would not now issue a sheet because the failure at Stage No. 2 prevented the triggering of Stage No. 3. Similarly, Stages 4, 5 would be without their respective triggers. But as noted above, after the first stack has been collated, all of the stages will be repetitively issuing sheets; partially completed stacks exist at all of the various receiving points along the stack conveyor 50. Thus, after the machine is started again one of the incomplete stacks at Stages 3, 4, 5 . . . along the conveyor will not receive the required additional sheets and incomplete stacks will result.

To prevent this condition trigger by-pass means, FIG. 26, described hereinafter, are provided which are automatically actuated by the trigger means 41 at the last stage of the chain, FIGURES 1 and 26. Thus after the first stack is collated, there is provided a continuous triggering of the stages independently of the issuance of sheets from the preceding stages. Thus, the various stages will eject sheets after the collator is again started without awaiting the transmission of a trigger signal, thereby completing the partially formed stacks present on the collator. Since extractor oscillator means, such as schematically shown in FIGURE 26 and described hereinafter, are provided for synchronously pulsing all of the stages, and since these oscillator means are coordinated in time with caliper oscillating means which synchronously pulse the caliper means at each stage and since both these oscillator means are synchronized in turn with the various transfer and conveyor means including the stack conveyor, then the collating operation will continue in correct fashion notwithstanding the trigger function is bypassed.

After the last desired sheet issues from the hopper 30 of Stage No. 1, the Start lever 160 is returned to the Stop position whereby Stage No. 1 loses its activation. At the same time, the trigger function is automatically restored and since no sheet issues subsequently from Stage No. 1, the succeeding stages, lacking trigger signals, will progressively stop after they deliver their respective sheets to the last-collated stack.

When it is desired to use less than the full capacity of the machine, the unused Stage Nos. 1, 2 . . . etc., may be simply deactivated. This is accomplished by actuating caliper disable means FIG. 26 at the deactivated stage or stages, each of these disable means being operated by a respective caliper disable lever 164, FIGURES 1, 3, 21 and 26. This operation prevents the caliper means at the unused stage from tripping the automatic cut-off mechanism including microswitch 162, which would otherwise result since no sheets are issuing therefrom. In addition, the previously described Start lever 160 is left in its Stop position and instead, a lever, 160′ ("Start No. 2," "Start No. 3," etc.) FIGURES 1, 3, 26 is actuated at the first stage to be used. The procedure described for operation at full capacity is then followed.

*Power distribution*

The operation of motor 60 is initiated, as illustrated in the circuit of FIGURE 26, by pressing normally-open start switch $S_1$ whereby a circuit is momentarily completed from electrical source terminal $P_1$ through the normally closed contacts 161 of cut-off switch 162, through the now-bridged contacts of switch $S_1$ and the normally closed contacts of a stop switch $S_2$, to the field of a relay R. The other relay terminal is returned to the power terminal $S_2$ as indicated by the ground symbols.

Energization of relay R results in closure of relay contact pairs $C_1$ and $C_2$, the latter completing a circuit from power terminal $P_1$ to motor 60, and the former acting as a holding circuit which shunts start switch $S_1$ to maintain relay R energized after start button $S_1$ is released. The motor 60 is thus energized.

Automatic stopping of the motor is accomplished by the switch 162 which when opened in response to a malfunction, acts to open the relay circuit thereby deenergizing motor 60. This automatic cut-off action may be bypassed during certain modes of operation by operating normally open switch $S_3$. When closed, this switch shunts cut-off switch 162. For manually stopping the collating action stop switch $S_2$ is opened.

Operation of motor 60 drives main shaft 68, FIGURE 2, as hereinbefore described. Shaft 68 extends the length of the apparatus as seen in FIGURES 12, 12*a* and 12*b*, the ends thereof being journaled in bearing 81, on plate 73, FIGURE 2, and bearing 82, on brace 83, FIGURE 12*a*; intermediate sections of shaft 68 are supported as by bearing 84 on brace 85, FIGURE 12*a*.

Driven by main shaft 68 is a branch shaft 86, FIGURE 12, via a sprocket 87 fast on shaft 68 near the distal end thereof, a chain 88, FIGURES 12, 12*b*, and a driven sprocket 89 fast on one end of shaft 86. The branch shaft 86 is journaled in a bearing 90 mounted on flange 74, and also in gear housing 91 provided at each stage along shaft 86.

Fixed on shaft 86 at a plurality of intermediate points are helical gears 93, FIGURE 12, one allocated to each stage of the machine and located in the respective housing 91. Driven by each gear 93 is a gear 94 fixed on one end of a respective transverse shaft 95 which is journaled in a bearing 96 secured to panel section 34. Fast midway on shaft 95 is a gear 97 which through idler gear 98 drives a gear 99 fixed on a shaft 100. This arrangement may also be seen in FIGURE 3. Each shaft 100 carries the sheet conveyor drive pulleys 46 which drive the respective sheet conveyor belts 43. Accordingly, the sheet conveyor means are continuously driven by the above-described transmission from main shaft 68.

The shaft 95 which carries gear 97 also carries at its forward end two of the transfer rolls 42, described hereinbefore. The inner of these rolls cooperates with the contiguous upper roll 42, free on a shaft 102, FIGURE 3, to transfer sheets 37 from the extractor means 38, 39 to the sheet conveyor means 43, 46, 47 and 48.

Fixed on main shaft 68 near the distal end thereof is a helical gear 103, FIGURE 12*a*, which engages a driven helical gear 104 fixed on a transverse shaft 105 which is journaled in bearings 106 secured to respective braces 107. The latter are connected with braces 83, 85 to form a rigid generally rectangular support means. Fixed on shaft 105 is gear 108 which meshes with a driven gear 109 on another transverse shaft 110. At one end and at an intermediate position, shaft 110 is journaled in bearings 111 and 112. The other end of the shaft extends forwardly of front panel 71 and carries the drive sprocket 51 of the stack conveyor chain 50. The stack conveyor is thus also continuously driven from main shaft 68.

The receiver conveyor is also driven continuously from main shaft 68. This is accomplished by a transmission which includes a helical gear 113 fixed on shaft 68 which drives a gear 114 fixed on a transverse shaft 115. Shaft 115 is journaled in bearings 116 secured to the respective braces 107. A gear 117 is secured to shaft 115 and meshes with a driven gear 118 fast on a shaft 120. The latter is journaled at an end and at an intermediate position in bearings 121 also on the respective braces 107. The other end of shaft 120 extends forwardly of panel section 71 and has fixed thereto the receiver conveyor pulley 56 which drives the receiver belts 55. The idler pulley 57 of the conveyor is fixed on a transverse shaft 122 journaled in bearings 123 mounted respectively on panel section 71 and a parallel rearwardly displaced panel 71*a* (see also FIGURE 2). By this arrangement, the receiver conveyor is also continuously driven from main shaft 68.

Power distribution for energizing the caliper and extractor functions include a gear 131 fast on main shaft 68 near the proximal end thereof, FIGURE 2, which gear drives helical gear 132 fast on one end of a shaft 133. The other end of shaft 133 extends forwardly of panel section 71 and has a drive sprocket 134 fixed thereto, FIGURES 1, 2. Sprocket 134, drives a chain 135 which is tensioned by a sprocket 136 rotatable on the end of an adjustable lever 137, the other end of which is clamped in desired angular position on a pin 138 on panel 71. Chain 135 drives in turn a sprocket 139 fast on a shaft 140 journaled in a bearing 141 mounted on panel section 34, FIGURES 2, 13. Shaft 140 has fixed to its other end caliper oscillator means including a crank 142, FIGURES 6, 13, the eccentric end of which is loosely coupled to a pitman rod 143. Rod 143 is loosely coupled to caliper drive bar 145, which bar reciprocates in response to rotary motion of shaft 140. The caliper drive bar 145 is accordingly reciprocally driven ultimately from main shaft 68. As will be described more fully hereinafter, bar 145 actuates means such as illustrated in FIGURES 13–16 which are operative to control the caliper function at each stage.

Figures 6, 7:
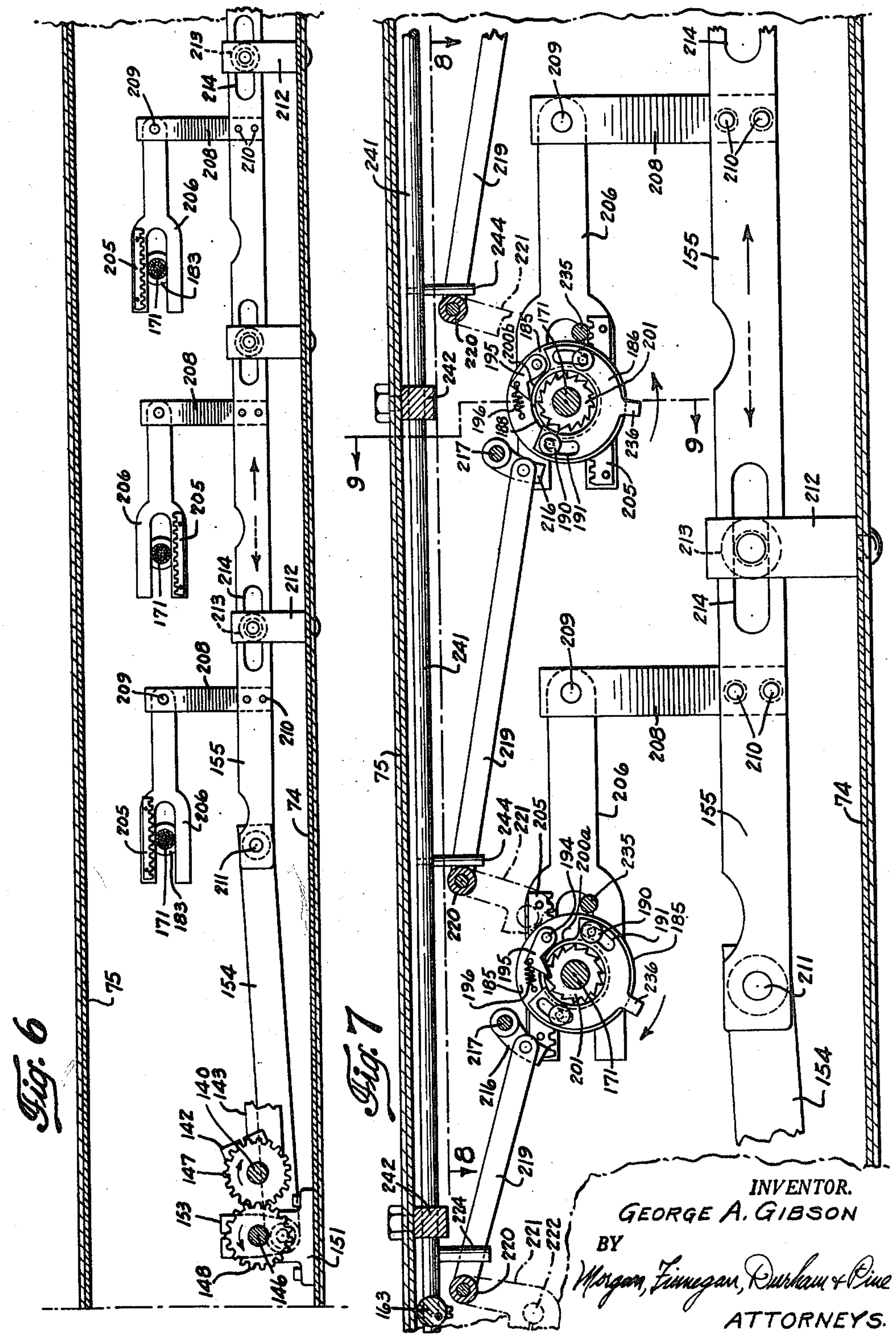
FIGURE 6 is an elevation view illustrating certain means for controlling the extraction of sheets at a plurality of stages as viewed from behind panel 72 of FIGURE 2 looking towards the rear of the machine.
FIGURE 7 is an enlarged elevation view partly in cross-section of a section of the subject mater of FIGURE 6, together with additional mechanisms also operative in controlling extraction.

A part of the above-described transmission actuated by main shaft 68 is also operative to transmit drive power to actuate extractor oscillator means for energizing extractor control means. Thus power is transferred from shaft 140, FIGURES 1, 6, 13, to a shaft 146 via meshing gears 147 and 148 fast on these respective shafts. Shafts 146 is journaled in bearings 149 and 151 on panel section 34 and flange 74, respectively. Fixed to the distal end of shaft 146 are extractor oscillator means including a crank 153, the eccentric end of which is rotatably coupled to pitman rod 154. (See FIGURES 2, 6, 13.) The other end of rod 154 is loosely coupled to extractor drive bar 155, which bar accordingly reciprocates in response to drive power from main shaft 68 via the transmission above described. Extractor drive bar 155 actuates in turn means such as illustrated in FIGURES 6, 7 and described more fully hereinafter for controlling the extractor roll 38 at each stage. As is evident in the drawings, particularly FIGURE 6, the extractor drive bar and the caliper drive bar 145 oscillate at the same frequency but are phase displaced.

In summary, transmission means from main shaft 68 driven by motor 60, are provided for continuously driving the:

(1) Sheet conveyor
(2) Transfer rolls
(3) Stack conveyor
(4) Receiver conveyor and for actuating respectively the:

(5) Caliper oscillator means
(6) Extractor oscillator means

*Extractor and control means*

The means for effecting the extractor function and the control thereof are illustrated in FIGURES 3 to 11. Thus as illustrated therein, extractor control roll 38 is mounted on an annular rim 170 which is fixed to a shaft 171 as by a set screw 170*a*, FIGURES 3, 4, 8 and 9. As is evident in FIGURE 4, the extractor roll 38 and the adjacent transfer and caliper mechanisms are all located in proximity with panel section 34 of the main panel 72 and accordingly contact the margin of the sheets 37 thereby avoiding interference with printing matter on the sheets and also enhancing the feature of accessibility mentioned hereinbefore.

Fixed on the forward end of shaft 171 is another control roll 172 which cooperates with the extractor control roll 38 in the extraction of sheets from the respective hopper. The shaft 171 also has fixed thereto a guide collar 174, FIGURES 4, 8, 9, secured to the shaft by means such as set screw 175. Shaft 171 is mounted in turn in a bearing sleeve 173, the forward end of which abuts guide collar 174. Bearing 173 is mounted in turn in journal block 176, FIGURES 8, 9, which is secured to panel 34 by means such as mounting screws 177. At its rear end, shaft 171 is provided with another guide collar 180 fixed to the shaft as by means of set screw 181. Rotatably mounted on shaft 171 and abutting locking collar 180 is a roller 183. Forward of roller 183 and rotatably mounted on shaft 171 is a drive disk 185 having a hub section 185*a*, FIGURE 9, coaxial with shaft 171. Keyed to drive disk 185 and mounted on hub section 185*a* is a pinion gear 182.

For driving disk 185 via pinion gear 182 there is provided a rack 205 which is secured to a yoke 206. The yoke 206 reciprocates in turn on the roller 183. Pivotally connected to the handle portion of yoke 206 is a transverse bracket 208. The other end of bracket 208 is connected in turn to reciprocating bar 155 by means of screws 210. It will be recalled that reciprocating bar 155 comprises the output member of the extractor oscillator means which include link 154 connected to bar 155 by pivot pin 211, crank 153, etc (see FIGURE 6). For guiding bar 155 in its reciprocal motion, brackets 212 fixed at one end to panel 74 and carrying guide rollers 213 at their distal ends are provided. The guide rollers 213 extend in turn into slots 214 in bar 155 and serve to guide the movement thereof.

The drive disc 185, driven by oscillator bar 155 as aforesaid, is in friction engagement at its front face with control disc 186, FIGURES 6–12, having a flange section 187 which mates with an annular groove 188 in drive disc 185 for providing alignment. Frictional engagement of the two discs is adjusted by means of a pair of screws 190 which pass through slots 191 in control disc 186 and into threaded engagement with drive disc 185 (see FIGURE 11). Spring loading of screws 190 is accomplished by means of springs 193 on the shanks thereof.

Figure 8:
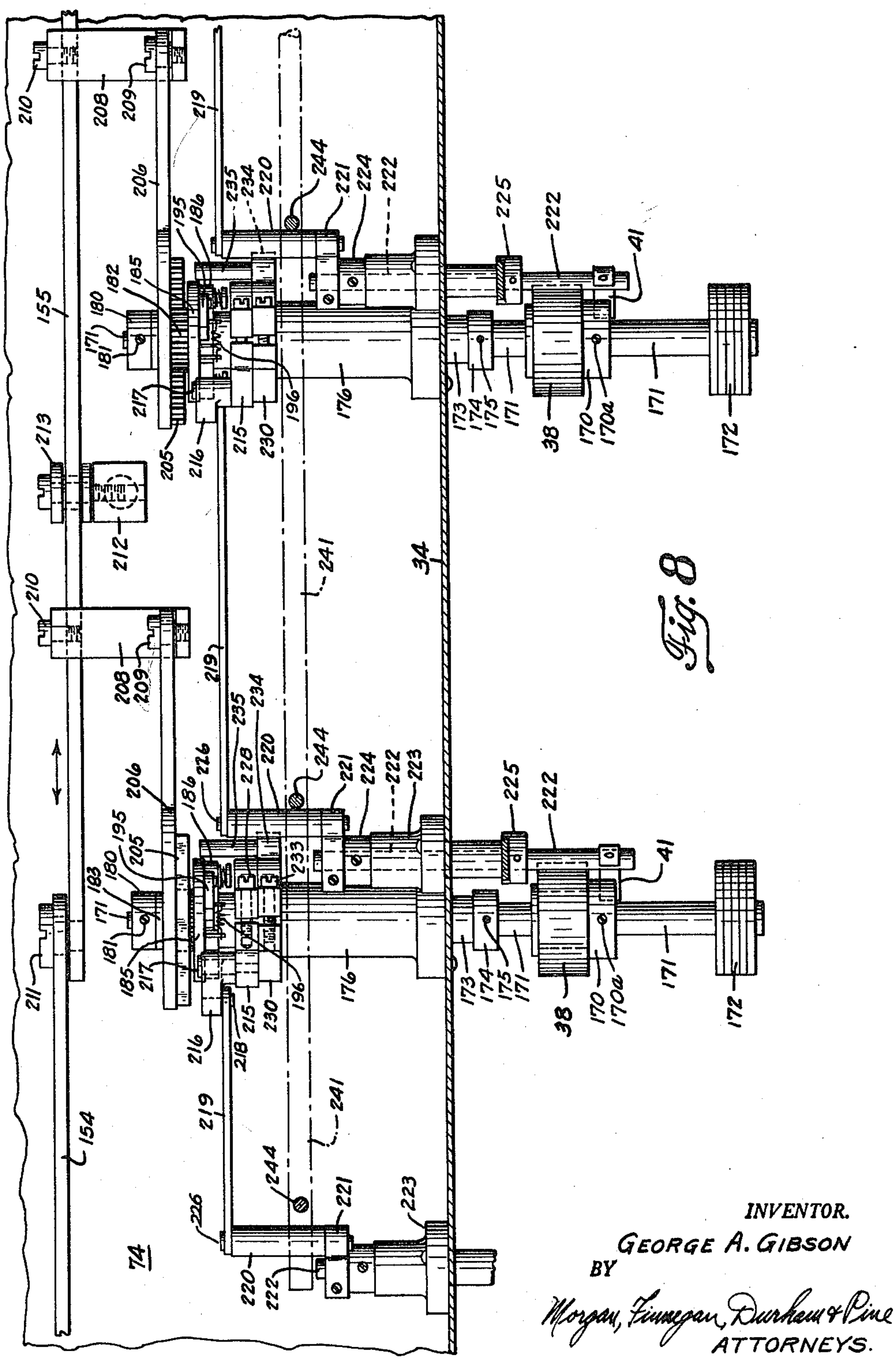
FIGURE 8 is a plan view partly in section taken along the lines 8—8 of FIGURE 7.
Figures 9, 10, 11:
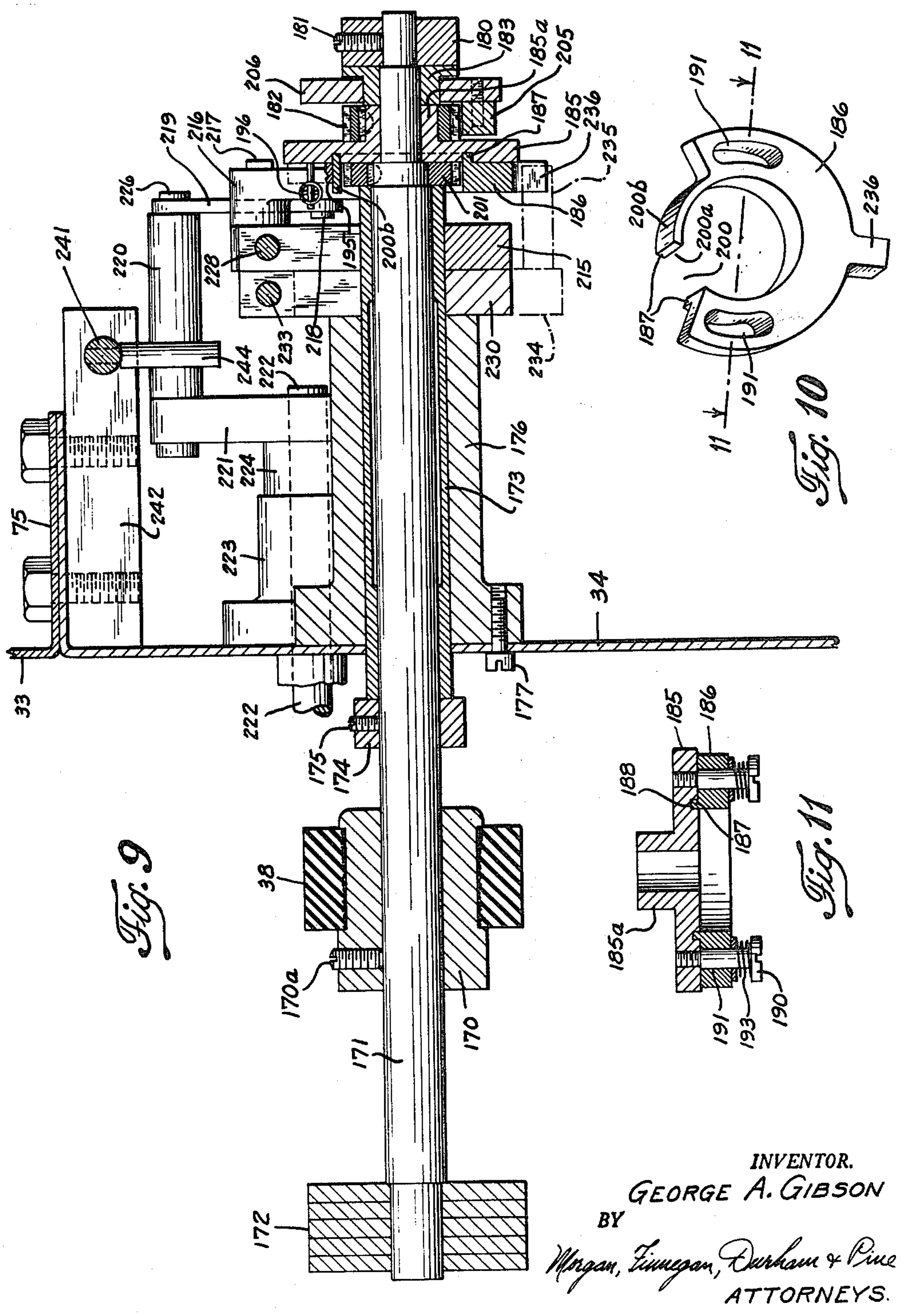
FIGURE 9 is an enlarged elevation cross-sectional view taken along the lines 9—9 of FIGURE 7.
FIGURE 10 is a perspective view of one of the operating mechanisms illustrated in FIGURE 9.
FIGURE 11 is a view taken along the lines 11—11 of FIGURE 10.

Pivoted on a pin 194, FIGURE 7, extending longitudinally from the front face of drive disc 185 is a pawl 195, FIGURES 7–9. This pawl is urged radially inward by means of spring 196, one end of which is connected to a post on the pawl and the other end of which is connected to a post fixed on drive disc 185. The pawl 195 is carried on the face of drive disc 185 at a point adjacent a region 200*a* of control disc 186. In this region 200*a*, a segment of disc 186 is cut away leaving an arcuate surface on which the engagement end of pawl 195 can ride. This arcuate surface in one segment is cut away leaving a slot 200, FIGURE 10, which provides access to the center section of the control disc.

Fixed coaxially on shaft 171 in the central area defined by the inner periphery of the control disc is a ratchet 201, FIGURES 7, 9. Since the ratchet 201 is keyed or otherwise secured to the shaft 171, then rotation of the former will cause a corresponding rotation of the extractor control roll 38 fixed on shaft 171. Whether ratchet 201 and the extractor control roll are rotated or maintained stationary, depends in part on whether pawl 195 is in engagement with the ratchet. If the pawl carried on drive disk 185 is in a position relative to control disk 186, such that the pawl under the urging of spring 196 gains access to ratchet 201 through slot 200 in the control disc, then it is possible for ratchet 201 to be driven from drive disc 185 via the pawl. If the pawl does not gain access to ratchet 201, but is rather confined to the region 200*b* of control disc 186, then ratchet 201 will not be driven. The two possible conditions described above are illustrated in FIGURE 7 with the pawl 195 in engagement with ratchet 201 at Stage No. 1 and out of engagement at Stage No. 2. Additional qualifications to the above described action will be described below.

It may be seen from the above that oscillation of bar 155 produces a like oscillation of rack 205 carried on yoke 206 and accordingly produces intermittent rotary motion of pinion 182, drive disc 185, pawl 195 and control disc 186, first in one direction and then in the other. As may be seen in FIGURES 6, 7 and 8, the rack 205 is positioned at the top of yoke 206 at one stage and on the bottom arm of the yoke at the adjoining stage, so that the rack position alternates progressively from Stage No. 1 to the final stage. Accordingly, when one stage is being driven in the clockwise direction, the adjacent stages are being driven in the counterclockwise direction.

As seen in FIGURES 8 and 9, a split ring 215 is clamped to bushing 173 by means of a screw 228 which passes through lugs on the ring 215. Pivotally mounted on the rear face of ring 215 is a pawl-like stop 216, one end of which is rotatably mounted on a pivot pin 217 longitudinally fixed to the face of ring 215. The distal end of stop 216 is loosely coupled by means of a pin 218 to a link 219, and the opposite end of this link is connected to one end of a transverse stud 220 by means of a pivot 226. The other end of stud 220 is coupled to the eccentric end of a lever 221, the other end of the lever being fixedly connected to a shaft 222. The shaft 222 is journaled in bearing 223 and also carries guide collar 224 and the hub 225 of a member which abuts the bearing 223. Affixed to the opposite or forward end of shaft 222 is, in the case of the trigger for Stage No. 1, the start lever 160. For the other stages, the trigger finger 41 and the respective intermediate start control 160′ (Start No. 2, Start No. 3, etc.) is affixed thereto. Thus, when start lever 160 (or 160′) or trigger finger 41, is rotated counterclockwise as seen in FIGURES 1 and 3, the link 219 as seen in FIGURE 7, will be displaced to the left, at their respective stage thus rotating the associated stop 216 clockwise. If, on the other hand, the start lever 160 is in the Stop position, or the trigger finger at the particular stage is not displaced, then stop 216 will be in its extreme counter clockwise position. In this connection, see also FIGURE 22.

In addition to the stop 216, another stop is provided as described below.

Mounted on bushing 173 adjacent, and just forward of ring 215, is a split ring 230 which is clamped on the bearing by means of a screw 233. Extending from ring 230 is a radial projection 234, FIGURE 8, fixed to which and extending rearwardly therefrom is a stop 235. This stop and the stop 216 described above cooperate with a projection 236 on control disc 186 as described below.

As bar 155 reciprocates, the drive disc 185 at each stage rotates reciprocally as described above. Control disc 186 will rotate in synchronism therewith since it is in friction engagement with the disc 185. Assuming that start lever 160 is in the Stop position or trigger finger 41 at the other stages is not actuated, then the free end of stop 216 will lie in the path traced by lug 236 on control disc 186. Assuming now that the drive and control discs are traveling in the counterclockwise direction as seen in FIGURE 7, and assuming further that the relative positions of the two discs are such that pawl 195 is riding on lip 200*b* of the control disc as illustrated at Stage No. 2 (right side) in FIGURE 7, then as the counterclockwise limit of rotation is approached, lug 236 engages stop 235 whereby control disc 186 is stopped while drive disc 185 continues counterclockwise through an additional angle. The dimensions of the system are such that this relative slippage between the two discs causes pawl 195 to pass through slot 200 into engagement with ratchet 201. This occurs during the interval when drive disc 185 ceases counterclockwise movement and commences clockwise movement.

Considering now the clockwise rotation, it may be seen that although pawl 195 is in engagement with ratchet 201, no drive action to the ratchet occurs because the pawl is rotating in the direction of ratchet pitch. Clockwise rotation accordingly corresponds with the normally stationary non-feed time interval of the extractor control roll. As discs 185 and 186 approach the clockwise limit, the lug 236 engages stop 216 causing disc 186 to stop, while drive disc 185 continues to rotate clockwise, thereby carrying pawl 195 up on lip 200*b* and out of engagement with ratchet 201. As the discs now commence counterclockwise rotation, no drive action occurs since pawl 195 does not contact the ratchet. Under the assumed conditions then, the shaft 171 remains stationary and the extractor control roll also remains stationary whereby no sheet issues from the stage. It may be seen from the above that when both stops 216 and 235 are contacted, no drive occurs. Further, stop 235 is contacted once every cycle and automatically resets the extractor control means in preparation for extraction which will occur at the end of the idling stroke if stop 216 is inoperative by reason of actuation of start lever 160 on trigger finger 41.

If now the start lever 160 for Stage No. 1 or a trigger finger 41 at any of the other stages (except the last) is displaced counterclockwise as seen in FIGURES 1 and 7, then during the non-feeding clockwise stroke, lug 236 fails to engage stop 216 since the latter is now displaced clockwise by the action of the start lever or trigger. Accordingly, pawl 195 remains in engagement with ratchet 201 so that on the opposite or counterclockwise stroke, ratchet 201 is driven counterclockwise thereby driving the extrator control roll 38. This pulsating action will occur repetitively so long as triggering exists and energization is provided by bar 155. Insofar as inter-stage timing is concerned, it may be seen that during the feed or extraction interval of one stage, the adjoining stages are in their non-feed or quiescent condition. The interval between the extraction and quiescent conditions is adjusted to enable a sheet extracted from a preceding stage to approach the succeeding stage.

It is evident from the above that whether a particular stage extracts a sheet from its respective hopper depends on the actuation of the trigger finger 41 of the prior stage or, in the case of Stage No. 1, on the placing of start lever 160 in the Start position.

It may also be observed that once a stage has been triggered and the collating operation put in process, there is no relative movement between the friction discs 185, 186. This reduces the tendency otherwise prevalent for wear of the discs and a consequent need to continually adjust and periodically replace them.

The means for providing the trigger by-pass function and for providing the extraction operation at less than full capacity are also illustrated in the above mentioned figures and in FIGURES 22–25. As seen therein there is provided a longitudinally extending shaft 241 journaled at intermediate points in bearings 242 secured to the panel 75. Depending from shaft 241 are transverse pins 244, one allocated to each stage and lying adjacent the respective stud 220 at each stage. Movement of shaft 241 to the left, as seen in FIGURES 1, 3, 8 and 22, causes each stud 220 at the respective stage to be displaced to the left bringing the respective stop 216 out of range of the associated lug 236 whereby each stage provides synchronized extraction independent of the triggering function. Shaft 241 is urged to the left as shown for example in FIGURE 22, by means including a weight 470 adjustably fixed to a pin 471 as by a set screw 472. Pin 471 depends angularly from a connector 473 adjustably clamped on a shaft 474. Shaft 474 is rotatably mounted in an inverted U-shaped bracket 475 which is fixed to flange 75. The weight of member 470 tends to urge shaft 241 to the left as seen in FIGURE 22 by virtue of a connection from member 473 to the shaft which includes a yoke 478 fixed to member 473 and a collar 479 fast on shaft 241. The yoke 478 is coupled to the collar by virtue of the engagement of the distal ends thereof with a groove in the collar.

Prior to the start of the collating operation, shaft 241 is controllably maintained in the position shown in FIGURE 22 by locking means including a collar 480, FIGURE 22, fast on the shaft which is engaged by a catch 481 at an intermediate point on a lever 482. One end of lever 482 is pivotally coupled to a bracket 484 secured to flange 75, while its other end is pivotally coupled to a link 485. The other end of link 485 is pivotally coupled in turn to a crank 221′ the opposite end of which carries a shaft 222′ to which is connected trigger finger 41 of the last stage. Lever 482 is urged upwardly as seen in FIGURE 22 by engagement with a spring 488, the opposite end of which is connected to the frame by means of a strut 490. Thus, as long as catch 481 engages collar 80, shaft 241 is locked in position.

When control lever 160 is moved to the Start position as illustrated by the broken lines in FIGURE 22, an extraction occurs at Stage No. 1 and in accordance with the triggering function, sheets subsequently issue progressively from the succeeding stages. When a sheet finally issues from the last stage, portending the complete collation of the first stack, trigger 41 at this stage is displaced to the right (referenced to FIGURE 22). This trigger action brings catch 481 out of engagement with collar 480 whereby shaft 241 is urged to the left under the influence of weight 470. As noted above, displacement of shaft 241 to the left moves the stops 216 at each stage clockwise via the respective studs 220 and linkages 219 whereby the extraction means of all of the stages are now continuously triggered or activated and the previously described progressive trigger function is by-passed.

When it is desired to stop the collating action, Start lever 160 is moved to the Stop position as shown in the solid lines in FIGURE 22. By virtue of the coupling between lever 160 and the shaft 241, the latter is displaced to the right against the action of weight 470 thereby restoring the progressive trigger function. To hold the shaft 241 in this position before it is permanently engaged by the locking mechanism associated with the last trigger finger 41, there is provided a detent mechanism on the shaft 222 which carries the lever 160. This detent mechanism includes an arm 492, FIGURES 22, 23, fast on the shaft 222 which arm carries a spring blade 493. Connected to blade 493 is a pin 494 which is urged by the action of the spring into a detent hole 495 on a bracket 496. The bracket is secured to panel section 34 while the detent hole is located in the bracket in a position corresponding with the Stop position of lever 160. Accordingly, when the lever is moved to this position, it and shaft 241 are held there by the detent mechanism described above. After the last sheet issues from the last stage, trigger finger 41 returns permanently to the position shown in FIGURE 22 whereby latch 481 engages collar 480 to hold shaft 241 to the right (as shown in FIGURE 22) so that a subsequent starting of the collator will not release shaft 241 until a new stack has been collated.

In addition to the automatic control of the triggering function as described above, manual control is provided by operating rod 163 which is fast on shaft 241. Movement of this rod to the left causes a by-passing of the triggering function as described above. For such manual operation, catch 481 must be released from collar 480 and the detent of the Start lever 160 must be released.

As was noted hereinbefore, a control 160′ is provided at the second, third and remaining stages except for the last stage. This control 160′, as seen in FIGURE 25, comprises an extension 500 of the member 225 fixed to shaft 222 of the respective stage. At its distal end extension 500 has affixed thereto a boss 501 which coaxially houses a sliding pin 502 which is connected at one end to a knob 503. Depression of knob 503 forces pin 502 against a bracket 505 affixed to panel section 33, and, with the Start lever 160′ in its Stop position, the pin engages a recess in the bracket to provide detent action.

Angular displacement of extension 500 to the left causes a corresponding counterclockwise rotation of the associated trigger finger 41, thereby initiating a triggering action at the next succeeding stage. Concurrently, a clearance between pins 244 on shaft 241 and the studs 220 at each operative stage is provided. Shaft 241 as described above, is accordingly free to move to the left, i.e., to the trigger by-pass position, after the trigger finger at the last stage has been triggered. When stopping the collating action at an intermediate stage, the control lever 160′ thereof is moved to the right, thus moving the associated trigger finger 41 clockwise and moving the shaft 241 to the right. The shaft is held in this position until permanently engaged by the locking mechanism of the last stage trigger, by means of the detent mechanism provided with each intermediate Start lever 160′ as described above.

Complementing the operation of the extractor control roll 38 at each stage is the aforementioned control finger 39, FIGURES 1, 3–5, the distal end of which is preferably covered by a hard rubber sheath which is in contact with control roll 38, these being contacted in turn by the fanned out pile of stock 35. Finger 39 is pivoted on a shaft 251 secured to panel 34 as by a nut 251*a*, FIGURE 5. A coaxial hub 252 on shaft 251 is interposed between panel 34 and a step on the shaft. The shaft 251 also serves as a support for guide plate 40. See FIGURES 3, 4 and 5. For adjusting the angular position of finger 39 and thus its relationship to extractor roll 38, means are provided including a cam 255 fast on a shaft 256, the cam abutting a bearing 258 in which shaft 256 is journaled. The distal end of the shaft has fixed thereto adjustment knob 260 while its opposite end, behind panel 34, is coupled to a friction plate 261 which engages a coaxial friction plate 261*a*. Plate 261 is angularly locked on shaft 256 but free to move longitudinally by means of a slot and key arrangement 263. A threaded integral extension 262 of shaft 256 is provided with a nut 265. A spring 266 coaxial on extension 262 is in engagement with nut 265 and with plate 261 via washer 267 whereby plate 261 may be adjustably urged against plate 261*a* to provide optimum friction therebetween, thus maintaining cam 255 in a fixed position after it is adjusted by knob 260 to provide the desired sheet extraction friction between control finger 39 and control roll 38.

*Caliper and control*

Figures 4, 5:
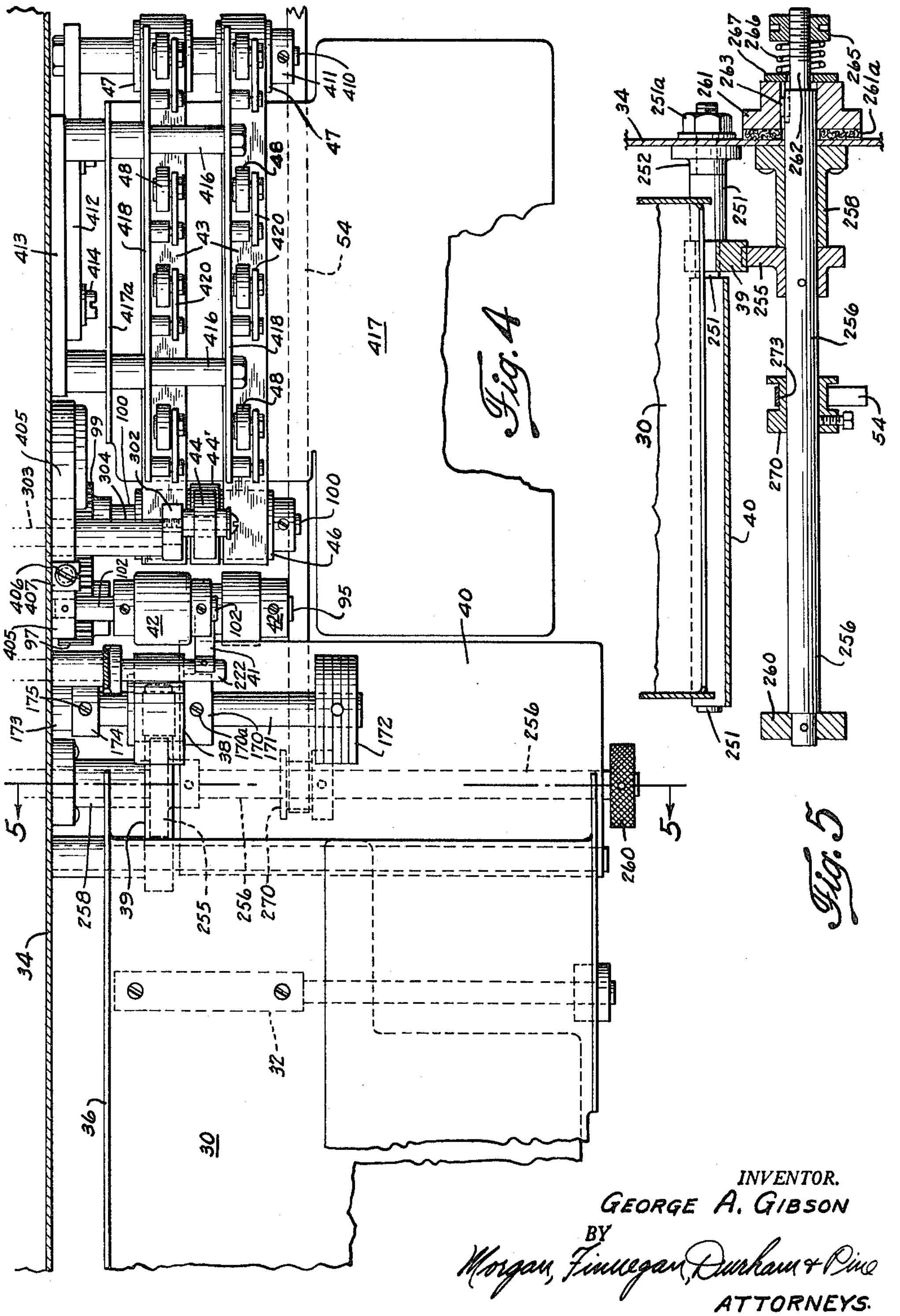
FIGURE 4 is a plane view partly in section of the mechanisms of FIGURE 3, the view being taken normal to the run of conveyor 43 in FIGURE 3.
FIGURE 5 is a sectional view taken along the lines 5—5 of FIGURE 4 and illustrating registering and extraction means mounted below the hopper of stages of the collator.

The means operative to effect the caliper function at each stage together with the signal and cut-off means responsive thereto as illustrated in FIGURES 1–4 and 13–22. Thus, as seen in FIGURES 3, 4 and 15, caliper 44 at each stage is mounted for unrestrained rotation on the eccentric end of a crank 302. The other end of crank 302 is fixed to the reduced section of a shaft 303 journaled in a sleeve 304 of a bearing 305 secured to the panel 34. The shaft 303 extends rearwardly of the bearing and carries connecting block 307, the block being adjustably secured to the shaft by means of set screw 308. Fixed in a transverse slot in block 307 is one end of a transverse follower 310. Screws 311 secure the follower to the block. It may be seen from the above that as follower 310 is displaced clockwise as seen in FIGURE 15, there is a corresponding clockwise rotation of block 307, shaft 303 and crank 302. Clockwise rotation of crank 302 causes caliper 44 to rotate away from the anvil roll 44′. The above movements are reversed for counterclockwise movements of follower 310. Gain and sensitivity are provided in both directions of transmission by virtue of the above arrangement which includes a large ratio of the effective length of follower 310 to the effective length of member 302. In the exemplary embodiment this ratio lies between 3 and 4, thereby providing a gain of between 9 and 16.

Extending transversely of the follower 310, near the distal end thereof, is a follower pin 312. During certain phases of machine timing, pin 312 rides on surfaces of a control cam 313 which comprises an integral extension of a connecting plate 314. As seen in FIGURE 15, one connecting plate 314 serves two adjoining stages since each plate carries two oppositely directed control cams 313, one for each stage of the pair. By means of screws 315, plate 314 connects to reciprocating bar 145 which it may be recalled comprises the output member of the caliper oscillator means described herebefore (see FIGURE 26). For guiding and supporting bar 145 means are provided including, at a plurality of points along the bar, a roller 320 extending transversely into a longitudinal slot 321 in the bar, the roller being free on an axle 322 which is secured in turn to an upstanding bracket 323 by means of a screw 324. The bracket 323 is connected in turn to the panel section 74 by means of screws 325.

As is evident in the figures, reciprocation of bar 145 produces oscillatory movement of connecting plate 314 and the two control cams 313 thereof. Movements of the cams (relative to their respective pins 312 on followers 310) are phase displaced one from the other by 180° or one-half cycle of operation. Each cam has upper compound surfaces identified as sections "a," "b," and "c," and when the control cam of one stage is in the position where section "a" is adjacent pin 312, the control cam of the adjoining stage is in the section "c" position relative to the respective pin 312.

Section "a" of each cam 313 corresponds to the caliper-disengage phase of caliper operation during which the caliper roll 44 is in a standby or non-operative position being displaced away from anvil roll 44'. This condition is illustrated at the left stage of FIGURE 15 where caliper roll 44 is remote from anvil 44'. As cam 313 is displaced relative to pin 312, the latter intercepts and is carried on section "b" which is slightly inclined downwardly. Section "b" corresponds with the transient phase of caliper operation and as section "b" contacts pin 312 following section "a," the pin, is progressively lowered gravitationally causing caliper roll 44 to move towards anvil 44'. Because the caliper oscillator including bar 145 is synchronized with the extractor oscillator (bar 155, etc.) and by virtue of system dimensions, caliper roll 44 is brought into its operative position adjacent anvil 44' at a time after a sheet or sheets has entered the caliper working area. This occurs at substantially the time when section "b" moves out of contact with pin 312 and the section "c" becomes contiguous thereto. Section "c," corresponding with the sensing phase of the caliper operation, has a steeper incline than section "b" and is relatively dimensioned such that pin 312 will not contact section "c" as the latter passes thereunder provided the proper number of sheets are now pasisng between the caliper roll and the anvil. With the proper number of sheets in transit, the thickness thereof is sufficient to keep the caliper roll displaced by the required distance from the anvil 44'. In this case follower 310 follows and is responsive to the caliper roll which is controlled in turn by the passing sheets. As noted above the follower pin 312 will not contact section "c" of the control arm under these correct conditions. If now, no sheet or an insufficient number of sheets is present, then follower 310 and its pin 312, again responsive to the caliper 44, will drop, the clearance between the latter and section "c" being adequate for this response. In analogous fashion an excessive number of sheets will raise the follower. The effects of these malfunction responses will be described below.

Paralleling reciprocating bar 145 is a shaft 328. Shaft 328 is suspended from bar 145 by bearing blocks 329 in which shaft 328 is journaled and which are fixed to bar 145 as by screws 332. The longitudinal reciprocation of bar 145 produces similar translation of shaft 328 this being insured by a pair of locking collars 333 coaxial on shaft 328 and fixed thereto. The collars abut the respective ends of bearing block 329 whereby for axial movement, the shaft 328 is fixed to and follows reciprocation of the bar 145. The former is also free to rotate about its own axis.

Rotatably mounted on shaft 328 and extending orthogonally therefrom to the region of the distal ends of followers 310 are a plurality of generally vertical trip levers 340, FIGURE 18, one allocated to each follower and accordingly to each stage. An annular section 341 at the end of each lever receives shaft 328 while the distal end has two edges 342 and 343 bevelled to form a vertical plane angularly offset from the axis of shaft 328. Between the two bevelled edges 342 and 343 is a slot 344 transverse to the lever. As suggested by FIGURES 18 and 19 and shown in FIGURES 15–17, each trip lever 340 is loosely confined in a vertical slot 345 of an upstanding unidirectional coupler 346 which has an annular section 347, the bore of which receives shaft 328. Trip lever 340 is free to rotate about shaft 328. Forward rotation of the lever, i.e., towards panel 34, carries coupler 346 therewith and since the coupler is fast on shaft 328 as by set screw 348, then the shaft will also rotate in response to forward rotation of trip lever 340.

Rotation of trip lever 340 occurs whenever either of the bevelled edges 342 or 343 thereof is impacted by the distal end of follower 310. As noted hereinbefore, during the sensing phase, the follower has either a correct position corresponding to passage of the correct number of sheets, an elevated position corresponding to an excess of sheets, or a depressed position which results from passage through the caliper means of an insufficient number of sheets.

For illustration it will be assumed that the correct sheet quantity is sensed by caliper roll 44 such that follower 310 assumes its correct position during the sensing phase. Under this condition, the ditsal end of the follower 310 will receive the slot 344 of trip lever 340 as the latter, carried by caliper oscillator bar 145 via shaft 328, moves into proximity with the follower. In this event there is no impacting of the follower by the trip lever, and the collating operation continues its cyclical pulsating operation as the caliper operation has in effect signalled the passage of a correct number of sheets.

In the event of passage of an excessive or insufficient number of sheets, follower 310 is impacted by bevelled edge 342 or bevelled edge 343 (the latter being illustrated at the right of FIGURE 15) whereupon the trip lever is rotated in the forward direction. See FIGURE 17. This movement occurs in opposition to a restraining action provided by a spring 350 connected between a pin 351 fixed on the respective trip lever and another pin 352 on connecting plate 314. There are two such spring arrangements provided for each connecting plate in conformity with the employment of two trip levers in conjunction with each plate, one for each stage of a pair of stages.

Forward displacement of trip lever 340 due, for example, to an insufficient number of sheets (see FIGURE 17) causes the upper end of the lever to impact a disc 360 fast on a link 361, the other end of which is secured to a shaft 362. The shaft 362 is journaled in a sleeve 363, with the shaft and sleeve extending through a journal block 362 on panel 34 forwardly towards the front of the collator. The distal end of shaft 362 terminates in vertically slotted section 368 and pivoted therein by means of pin 369 is the flag 45. In the normal position, shown by a broken line in FIGURE 17, flag 45 is oriented vertically with a detent section 378 being located in the interior of sleeve 363. To provide toggle action flag 45 is connected at a lug 370 thereof to a spring 371 which connects in turn to a post 373 on a bracket 374. The bracket is housed on sleeve 363 and spring 371 tends to rotate flag 45 counterclockwise as shown in FIGURE 17. The action of the spring is opposed by the detent action, so that the flag 45 is normally upstanding. However, when disc 360 is impacted as aforesaid, shaft 362 is displaced longitudinally, thereby displacing detent 378 out of the end of sleeve 363, whereupon spring 371 pulls the flag into tilted position as illustrated by the solid lines in FIGURE 17. Further rotation of the flag is prevented by interference between lug 370 and the lower section of sleeve 363. Thus, whenever, an incorrect number of sheets is sensed by the caliper means, an identification of the malfunctioning stage is provided conveniently in the form of a displaced flag. Other indicating means may of course be used, including a lamp in an electrical circuit which is energized from a switch closed by the action of trip lever 340. As is evident in FIGURE 17, flag 45 will remain in the tilted signalling position until it is manually returned to the normal position. Lever 340, however, returns to its normal upstanding position, i.e., is reset, by means of spring 350 when the lever is moved out of interfering engagement with follower 310.

When the caliper means signal the passage of an incorrect number of sheets, trip lever 340 as noted above is displaced forwardly. Since the lever is carried in slot 345 in coupler 346, displacement of the lever produces a like displacement of the coupler. Since the latter is fast on shaft 328, then there is a corresponding angular rotation of the shaft which is counterclockwise as illustrated in FIGURE 17. Rotation of shaft 328 produces a like angular displacement of a transverse arm 380 fast on the shaft as by screw 381, FIGURES 13, 20. The distal end of arm 380 carries a plate 382 which engages the armature 161 of the previously described microswitch 162 and actuates the latter, provided shaft 328 has been rotated in response to a malfunction signal from the caliper means. Such a rotation is illustrated in FIGURE 20. Actuation of switch 162 causes the contacts thereof to open whereby the motor 60 loses its energization and the collating action after a brief coating interval is stopped. When trip lever 340 is reset, shaft 328 and couplers 346 return to their normal position under the urging of a spring 388, FIGURES 14, 15. Reset occurs whenever the trip lever 340 moves out of engagement with the respective follower 310, as after the coasting period or by placing the correct number of sheets between the caliper 44 and the associated anvil 44'.

For disabling the caliper means at any stage by operation of the caliper disable control 164, means are provided including a shaft 390, FIGURE 15, journaled in a bearing 391 on panel 34 and fixed at one end to control arm 392 of control 164 (FIGURE 21). The control arm houses a detent pin 393 which is urged against a detent plate 394 by means of a spring 395 carried on arm 392, and connected to pin 393. The pin engages either of two cavities in plate 394 (FIGURE 3) corresponding with the caliper On and Off positions. Operation of control arm 392 produces rotation of shaft 390 and corresponding rotation of a crank 398 fixed to the distal end of shaft 390. The eccentric end of crank 398 is pivotally connected by pin 399 (FIGURES 15, 16) to one end of a link 400 which depends therefrom adjacent the intermediate region of follower 310. Link 400 includes a slot 401 in which is disposed a pin 402 fixed on the follower. The pin normally slides freely within the slot as follower 310 oscillates during the standby, transition and sensing phases of caliper operation. This condition is illustrated in FIGURES 15, 16.

When it is desired to disable the caliper operation at any stage, control 164 is rotated in the appropriate direction, FIGURES 1, 3, 15, whereby the base of slot 401 engages pin 402 and the follower is accordingly rotated away from its normal position and clear of trip lever 340 as shown by the broken lines in FIGURE 15. In this event the caliper function at the stage in question is disabled.

It may be seen from the above that certain outstanding features reside in the caliper and control arrangement. It is noted, for example, that the caliper operation is programmed by means of the cooperation between control cam 313 and the respective follower 310 these being coordinated with the extraction operation. According to this programming arrangement the caliper means, including caliper roll 44, are controllably brought into sensing position for effecting the caliper operation at only those periods when sheets are in the working area of the caliper means. The anvil 44' however is continuously actuated by shaft 100, FIGURES 3, 4. This programming provides substantial elimination of problems wherein the caliper would be impacted by the entering sheet or sheets, which impact could product transient oscillations and the like. These oscillations would produce in turn inadvertent tripping of cut-off mechanisms and the like.

A further feature relates to the fact that each stage is provided with its own caliper means which, in conjunction with caliper signalling means, permits the automatic cut-off of the apparatus at virtually the very instant an abnormal number of sheets occurs. This feature is enhanced by the signalling means which indicate that stage at which the malfunction occurs.

A feature feature of the caliper and control means relates to the precise and coordinated timing of the caliper operations at each stage. Thus, the single plate 314 carrying two control cams 313 and two trip levers 340, oscillates between the followers 310 of adjacent stages, such that while one stage is in the sensing phase the other stage is in the standby or inoperative phase. Accordingly, alternate stages caliper the respective sheets substantially simultaneously.

*Machine timing*

Certain elements of the timing of the various mechanisms of each stage as well as interstage timing characteristics have been described hereinbefore. In summary, it may be noted that after the trigger function has been bypassed, the extractor control rolls 38 are actuated from the extractor oscillator means such that alternate stages provide extraction simultaneously. Accordingly, sheets are extracted from each of the stages 1, 3, 5 . . . $2n-1$, at substantially the same time. See FIGURES 1, 27. In between the extraction periods of this group of stages, the stages 2, 4, 6 . . . $2n$, extract sheets simultaneously.

The calipering action, like the extracting action, occurs simultaneously at alternate stages with the even group of stages providing calipering at one time and the odd number of stages providing calipering at a different time interval which occurs in between the calipering occurrences of the even group.

These relationships are schematically illustrated in FIGURE 27. Thus the extraction interval, $E_1$, occurs substantially simultaneously at one group of stages while during the alternate half cycle, $E_2$, extraction occurs simultaneously at the other group (the reciprocal of the time interval $E_1+E_2$ comprises the extraction frequency). As suggested in FIGURE 27, the calipering interval, $C_1$, at one group of stages (corresponding with region "*c*" of caliper cam 313, FIGURE 14) occurs after the extraction cycle, $E_1$, of that group. Similarly caliper interval, $C_2$, lags extraction interval, $E_2$, of the second group. This insures that a sheet has moved well into the calipering area, its leading edge being as far down, for example, as the center of the sheet conveyor belt. See FIGURE 3. (Note also in FIGURE 27 that the caliper and extraction frequencies are the same.) This lag not only avoids problems engendered by an impacting of the caliper roll by the leading edge of the sheet but also eliminates the possibility of generating the correct caliper response in a case where two sheets, instead of one, have been extracted with the second overlapping the trailing area of the first. Without proper timing, a calipering of the unlapped leading edge of the first sheet can occur with a consequent failure to signal the malfunction.

It may also be observed that the extractor control rolls 38 continue to rotate after the extraction period, $E_1$ or $E_2$, due to the movement of the sheets caused by transfer rolls 42. The extraction period however relates to the interval in which the extractor rolls are actually driven by the pinion 182, rack 205, etc., through the pawl 195 and ratchet 201, etc.

Further factors in machine timing including the synchronization and coordination of the receiving means relative to the stages. Thus conveyor 50 travels at a speed related to the extraction and caliper frequency such that a sheet is received on platform 49 and after a delay is impelled forward, a corresponding sheet from the next succeeding stage is received on the platform and after a substantially equal delay is impelled forward by the same impeller and so on.

Insofar as triggering is concerned, the activation of a trigger at a particular stage occurs during the extraction cycle of that stage, the trigger being in close proximity with the corresponding extractor; but this occurs during the inactive or non-feed cycle of the next succeeding stage thereby permitting the displacement of the associated stop 216 in preparation for the subsequent extraction cycle of that stage.

*Register, conveyors, impellers transfer means*

The general features of the sheet and stock conveyors, the impellers, transfer means and the register means have been described hereinbefore. Additional details, illustrated in FIGURES 3–5, are set forth below.

While it has heretofore been the practice to provide a spacing between impellers equal to the spacing between stages, the applicant has determined that a substantial reduction in the space occupied by the collator can be effected by increasing the space between impellers to a value which is twice, or some greater multiple of, the space between stages. Accordingly, the space between the stages can be materially reduced while the space between impellers, being twice the interstage space, can still be sufficiently large to insure proper reception of even large sheets on the conveyor 50.

For conveniently mounting register fingers 54 there are provided on shaft 256 of the third, fourth and successive stages, means comprising a sleeve 270 coaxial thereon (FIGURE 5) and adjustably fixed thereto as by a set screw. One end of each register finger 54 is wound loosely around an annular groove 273 in the respective sleeve 270, its other end projecting radially downward into contact with platform 49. Static discharge means may also be mounted at various stages with their distal ends arranged for contact by the issued sheets.

For adjusting the contact pressure between transfer rolls 42, the upper roll, connected to shaft 102 as described hereinbefore, may be displaced. Thus shaft 102 is fixed orthogonally in one end of a lever 405 the other end of which is pivoted to panel 34. An adjutsing screw 406 threaded in a bracket 407 secured on panel 34 bears against lever 405 in the region adjacent shaft 102 and rotation of the screw controls the degree to which upper roll 42 is urged against the lower mating roll. For assisting the transfer operation, the shaft 101 which carries the lower transfer roll also carries an additional roll 42 adjacent thereto. See FIG. 4. The distal end of trigger finger 41 lies between these adjacent rolls.

The sheet conveyor belts 43 at each stage are driven by shaft 100 via respective drive pulleys 46 as noted hereinbefore. The driven pulleys 47 are rotatably mounted on a common shaft 410, one end of which has a lock collar 411 affixed thereto and the other end of which is secured to bracket 412. This bracket is adjustably clamped for tension regulation to panel 34 by means of screws 414 which pass through slots 415 in bracket 412 and are secured to the panel. A pair of posts 416 fixed on a bracket 413 carry a tray 417, the surface of which bears in sections against the underside of each belt 43 and functions as support for the sheets 37 as they pass through the transfer section. Additional guidance is provided by a flange 417*a* on the rear side of the tray. Mounted above the tray 417 and the belts 43 are a pair of parallel brackets 418 also fixed to posts 416. Brackets 418 each carry a plurality of pivotally mounted levers 420. The distal end of each lever carries the freely rotatable guide rolls 48 described hereinbefore.

The tension in the stack conveyor 50 may be readily adjusted by positioning a bracket 425 which carries shaft 424 on which idler 52 is rotatably mounted, and clamping the bracket to panel 71 by means of screws 426 which are disposed in slots 427 in the bracket and threaded into tapped holes in the panel.

As noted hereinbefore, stages of the collator may be deactivated for operation at less than full capacity. In addition, an inspection of the various mechanisms indicates that the physical addition of further stages may be readily accomplished. Thus shaft 68, bars 145, 155 and shafts 241 and 328 may be equipped with suitable couplings to permit insertion of additional sections. A longer conveyor belt 50 may also be simply provided.

The invention in its broader aspects is not limited to the specific mechanisms shown and described but departures may be made therefrom within the scope of the accompanying claims without departing from the principles of the invention and without sacrificing its advantages.

What is claimed is:

1. Collating apparatus comprising a plurality of sheet-feeding stages and means for receiving the sheets issuing from said stages, a first one of said stages having extraction means and including trigger means responsive to the feeding of a sheet through said first stage and a second of said stages including extraction means interconnected with and responsive to said trigger means of said first stage for causing the issuance of a sheet from said second stage and extraction drive means having means for alternately supplying drive to said extraction means of said first and second stages whereby said stages regularly issue sheets in staggered timed relationship.

2. Collating apparatus as set forth in claim 1 in which said second stage also includes trigger means for controlling the extraction means of a third one of said stages.

3. Collating apparatus as set forth in claim 1 in which said first stage includes means for activating said trigger means to thereby trigger said second stage independently of said feeding of said sheet through said first stage.

4. Collating apparatus as set forth in claim 2 in which said second stage includes means for activating said trigger means independently of said feeding of said sheet therethrough.

5. Collating apparatus as set forth in claim 1 in which said trigger means of said first stage and said extraction means of said second stage are coordinated in time such that said second stage issues a sheet a predetermined time interval after the issuance of a sheet from said first stage.

6. Collating apparatus as set forth in claim 5 in which said means for receiving said sheets changes from receiving relationship with respect to said first stage to receiving relationship with respect to said second stage at a rate related to said time interval.

7. Collating apparatus as set forth in claim 1 in which said extraction means of said second stage includes means responsive to said trigger means of said first stage for energizing said extraction means of said second stage from said drive means and means for bypassing said trigger means of said first stage and continuously energizing said second stage extraction means from said drive means independently of the issuance of sheets from said first stage.

8. Collating apparatus as set forth in claim 7 in which said bypass means are responsive to additional trigger means at one of said stages.

9. Collating apparatus comprising receiving means, a plurality of $n$ sheet-feeding stages where $n$ is any integer greater than two, said stages being arranged in the order 1, 2, 3 . . . $n$ adjacent said receiving means, means for triggering the issuance of sheets from said stages to said receiving means in the progression 1, 2, 3 . . . $n$, and means for bypassing said triggering means during the collating operation and for triggering one group of said stages substantially simultaneously during one repetitive period and another group of said stages substantially simultaneously during a different repetitive period.

10. Collating apparatus as set forth in claim 9 in which said bypass means are responsive to the issuance of a sheet from the $n$th stage.

11. Collating apparatus comprising conveying means, a plurality of at least four sheet feeding stages arranged adjacent to and progressively along the operating path of said conveying means, each of said stages including extracting means for feeding a sheet from the respective stage to said conveying means, extraction drive means having means for supplying drive to the extraction means of one group of said stages at one time and to another group at a different time, certain of said stages including trigger means responsive to the passage of a sheet through the respective stage and means interconnecting each said trigger means to the extraction means of the next successive stage for actuating same whereby said sheets issue progressively from said stages to said conveying means.

12. Collating apparatus as set forth in claim 11 in which said progressive issuance of sheets occurs repetitively.

13. Collating apparatus as set forth in claim 11 in which the linear speed of said conveying means is substantially proportional to the distance between the feed locations of adjacent of said stages divided by the time interval between the issuance of sheets from adjacent stages.

14. Collating apparatus comprising at least four linearly aligned stages each including extraction means for ejecting sheets from the respective stage, means adjacent said stages and operated in timed relation to said drive means for stacking said ejected sheets, cycling drive means in alternate cycle engagement with said extraction means for repetitively and alternately energizing said extraction means of said stages whereby sheets issue from one group of said stages during one period of each cycle and from another group of said stages during another period of each cycle.

15. Collating apparatus as set forth in claim 14 in which said stacking means include receiving means operated at a rate related to the repetition frequency of said drive means for receiving in progression corresponding issued sheets of said stages.

16. Collating apparatus as set forth in claim 15 in which said receiving means include a plurality of receivers each of which is progressively disposed at said operating rate in receiving relationship with respect to said stages.

17. Collating apparatus as set forth in claim 14 in which said energizing means comprise oscillator means and said extraction means of said stages each include means unidirectionally responsive to said oscillator means, said unidirectional means of said one group of stages being responsive to one direction of oscillation and said unidirectional means of said other group of stages being responsive to the opposite direction of oscillation.

18. A plurality of sheet-feeding stages for use in stock processing apparatus, each stage comprising a source of sheets, repetitively energized extraction means communicating with said source for repetitively extracting predetermined number of sheets from said source, caliper means communicating with said extraction means for measuring the number of extracted sheets, said caliper means including a caliper member and caliper control means for controlling the position of said member relative to said sheets, said caliper control means of one stage being oppositely phased with respect to the caliper control means of the adjacent stage; timing means for synchronizing and delaying the activation of said caliper control means with respect to said extraction means whereby said caliper means measure a region of said sheets remote from the margins thereof, and interstage control means for alternately actuating said caliper control means of adjacent stages.

19. Apparatus as set forth in claim 18 in which means are provided in said control means for programming the operation of said caliper means in timed relation to the operation of said extraction means.

20. Apparatus as set forth in claim 18 in which there are included means responsive to said caliper means for generating signals indicative of the result of said measurement and signalling means responsive to said caliper responsive means.

21. Apparatus as set forth in claim 18 in which said extraction means are arranged adjacent the margin of said sheets.

22. Apparatus as set forth in claim 19 in which said programming means permits said caliper member to move into the sensing condition after an interval of time, measured from the operation of said extraction means, which is of sufficient duration to permit the leading edge of said extracted sheets to move substantially clear of said caliper member.

23. Apparatus as set forth in claim 18 in which said caliper means and extraction means are energized from interconnected motive means whereby said synchronization is provided.

24. Apparatus as set forth in claim 18 including means responsive to said caliper means for de-energizing said extraction means when an incorrect number of sheets is sensed by said caliper means.

25. Collating apparatus comprising a plurality of sheet-feeding stages each stage comprising a source of sheets, extraction means communicating with said source for repetitively extracting predetermined numbers of sheets from said source, caliper means communicating with said extraction means for measuring the number of extracted sheets and timing means for synchronizing and delaying the activation of said caliper means with respect to said extraction means whereby said caliper means measure a region of said sheets remote from the margins thereof, energizing means for activating the extraction means and timing means of adjacent stages alternately whereby alternate stages issue sheets substantially simultaneously and caliper said sheets substantially simultaneously.

26. Collating apparatus as set forth in claim 25 in which each stage includes means for programming the operation of said caliper.

27. Collating apparatus as set forth in claim 25 in which each stage includes indicating means responsive to the respective caliper means for indicating certain results of said measurements.

28. Collating apparatus as set forth in claim 25 in which cut off means responsive to said caliper means are provided, said extraction means being responsive to said cut off means whereby said extraction means are deactivated when said cut off means are signalled by said caliper means.

29. Collating apparatus as set forth in claim 25 in which certain of said stages each include means for deactivating the respective stage.

30. Collating apparatus as set forth in claim 25 in which receiving means are included, said receiving means are included said receiving means being in communication with said stages.

31. Collating apparatus as set forth in claim 30 in which said receiving means comprise movable conveying means synchronized with the frequency of said alternation of said extraction means at said adjacent stages.

32. Collating apparatus comprising a plurality of sheet-feeding stages including means for receiving sheets issued from said stages for collating same, said receiving means including a plurality of movable receiver stations each of which has a sheet receiving region corresponding with at least two of said stages; and means for cyclically issuing sheets from adjoining stages at different times, the rate of traverse of said stations being related to the interval between said times.

33. Collating apparatus comprising conveying means, a plurality of sheet feeding stages disposed along the operative path of said conveying means for issuing sheets thereto, said conveying means including a plurality of connected impelling means which traverse said operative path for impelling sheets received by said conveying means, said impelling means being separated by a distance at least twice as large as the distance between stages; and means for cyclically issuing sheets from adjoining stages at different times, the rate of traverse of said impelling means being related to the interval between said times.

34. Collating apparatus comprising generally upstanding panel means inclined from the vertical by an acute angle, a plurality of sheet feeding stages mounted along said panel means on one face thereof, receiving means coupled to said one face of said panel means in proximity with said stages so as to receive sheets issued therefrom, each of said stages and said receiving means including means for storing, manipulating and stacking sheets and the like, and means mounted on the other face of said panel for actuating and controlling said manipulating and stacking means, said storing means comprising hopper means inclined along said panel and also inclined from the vertical in substantial parallelism with said panel means.

35. A plurality of caliper means for measuring the thickness of substantially flat stock supplied from adjacent sources in sheet processing apparatus and the like, each caliper means comprising a caliper member oriented adjacent the respective stock and urged toward contact therewith, programming means for controlling the movement of said caliper member into and out of a sensing position in an intermediate region of said respective stock and means for coupling said programming means to said caliper member, said programming means being oriented in out-of-phase relationship with respect to the programming means of the adjacent caliper means; and oscillatory drive means for alternately actuating adjacent programming means whereby, while the caliper of one stage is programmed in the sensing position, the caliper member of the adjacent stage is out of the sensing position.

36. Caliper means as set forth in claim 35 including means operatively engaged with said coupling means during said sensing period for signalling the response of said caliper member.

37. Caliper means as set forth in claim 35, in which said coupling member is arranged to provide amplification of the movement of said caliper means relative to the control movement of said programming means.

38. Caliper means as set forth in claim 35, in which said programming means comprise cam means and said coupling means include a follower for said cam.

39. Caliper means as set forth in claim 36, in which said caliper response means includes means for indicating an abnormal caliper response.

40. Caliper means as set forth in claim 36, in which said caliper response means comprise a member having a contour for accommodating movements of said coupling means corresponding with the correct caliper response and for impacting said coupling means when said coupling movement corresponds to incorrect caliper responses.

41. Caliper means as set forth in claim 35 including oscillator means coupled to said programming means for repetitively cycling the same.

42. Caliper apparatus for calipering, over predetermined intervals, stock at two separate adjacent locations in stock processing machines comprising a caliper member at each of said locations, programming means comprising cam means allocated to each of said members for moving the respective member into and out of sensing position in an intermediate region of the respective stock, said respective adjacent cam means being disposed in opposing relationship, coupling means for coupling said programming means to the respective caliper member, means for energizing said programming means whereby said caliper members are cyclically and alternately moved into and out of their respective sensing positions and signalling means responsive to the respective coupling means.

43. Apparatus as set forth in claim 42, in which said translating means comprise an oscillating structure on which said programming means are mounted.

44. Collating apparatus comprising a plurality of sheet-feeding stages each including a source of sheets, extraction means for extracting sheets from the respective source, trigger means communicating with said extraction means and responsive to the extraction of respective sheets and caliper means communicating with said trigger means for calipering an intermediate region of said extracted sheets; receiving means for receiving sheets issued by said stages, means for alternately energizing said extraction means of said stages, said energizing means being controlled by said trigger means and said caliper means.

45. Apparatus according to claim 44 including means for effectively coupling said energizing means to said extraction means independently of said trigger means.

46. Apparatus according to claim 44 including means for energizing said caliper means in synchronism with said energization of said extraction means.

47. Apparatus according to claim 44, in which the extraction means of alternate stages are concurrently energized.

48. Apparatus according to claim 44 including means for disabling certain of said stages.

References Cited by the Examiner

UNITED STATES PATENTS

| | | | |
|---|---|---|---|
| 460,165 | 9/91 | Stebbins et al. | 270—58 |
| 1,041,806 | 10/12 | King | 270—56 X |
| 2,020,321 | 11/35 | Kleineberg | 270—56 |
| 2,298,368 | 10/42 | Goebel et al. | 270—56 X |
| 2,344,345 | 3/44 | Elliott. | |
| 2,406,040 | 8/46 | Ryan et al. | 101—57 |
| 2,427,839 | 9/47 | Davidson | 270—58 |
| 2,479,060 | 8/49 | Davidson | 270—58 |
| 2,801,846 | 8/57 | Stoothoff | 101—132.5 |
| 2,829,888 | 4/58 | Thomas | 270—58 |
| 2,908,220 | 10/59 | Eichenbaum | 101—132.5 |

FOREIGN PATENTS

| | | |
|---|---|---|
| 798,086 | 7/58 | Great Britain. |

EUGENE R. CAPOZIO, *Primary Examiner.*

ROBERT A. LEIGHEY, WILLIAM B. PENN, ROBERT E. PULFREY, *Examiners.*